(12) United States Patent
Bastian, II et al.

(10) Patent No.: US 8,881,526 B2
(45) Date of Patent: Nov. 11, 2014

(54) LASER FOR STEAM TURBINE SYSTEM

(75) Inventors: William A. Bastian, II, Carmel, IN (US); Elizabeth Sobota, Greenfield, IN (US)

(73) Assignee: Bastian Family Holdings, Inc., Indianapolis, IN (US)

( * ) Notice: Subject to any disclaimer, the term of this patent is extended or adjusted under 35 U.S.C. 154(b) by 242 days.

(21) Appl. No.: 13/229,137

(22) Filed: Sep. 9, 2011

(65) Prior Publication Data

US 2012/0227402 A1  Sep. 13, 2012

Related U.S. Application Data

(63) Continuation of application No. PCT/US2009/036627, filed on Mar. 10, 2009.

(51) Int. Cl.

| | |
|---|---|
| *F01K 13/00* | (2006.01) |
| *F01K 23/06* | (2006.01) |
| *F03G 6/00* | (2006.01) |
| *F03G 7/00* | (2006.01) |
| *F03C 1/00* | (2006.01) |
| *F01K 21/02* | (2006.01) |
| *B63H 11/12* | (2006.01) |
| *F02K 9/50* | (2006.01) |
| *F03H 1/00* | (2006.01) |
| *F02C 7/264* | (2006.01) |
| *F02G 1/055* | (2006.01) |
| *F02G 3/00* | (2006.01) |
| *A61N 5/06* | (2006.01) |
| *G01J 3/10* | (2006.01) |
| *H05G 2/00* | (2006.01) |
| *F01K 27/00* | (2006.01) |
| *F01K 3/18* | (2006.01) |

(52) U.S. Cl.
CPC ............... *F01K 27/00* (2013.01); *F01K 3/186* (2013.01)
USPC .............. 60/645; 60/670; 60/641.15; 60/531; 60/514; 60/227; 60/203.1; 60/39.821; 250/504 R

(58) Field of Classification Search
CPC ..................................................... B05B 7/228
USPC ............... 60/641.15, 645, 203.1; 290/52; 204/157.41; 250/432 R; 392/387; 477/3; 222/3; 239/136
See application file for complete search history.

(56) References Cited

U.S. PATENT DOCUMENTS 3,495,406 A * 2/1970 Donatelli et al. ............... 60/227
3,732,692 A   5/1973 Norell
(Continued)

FOREIGN PATENT DOCUMENTS

CN  101169043 A * 4/2008 .............. F01B 29/12
EP  0 551 546 A1  7/1993
(Continued)

OTHER PUBLICATIONS

CN 1011690423 A English Language Abstract.
(Continued)

*Primary Examiner* — Kenneth Bomberg
*Assistant Examiner* — Daniel Wagnitz
(74) *Attorney, Agent, or Firm* — Woodard, Emhardt, Moriarty, McNett & Henry LLP

(57) ABSTRACT

A steam turbine system uses a laser to instantaneously vaporize water in a nozzle within a turbine. This steam is then used to rotate the turbine. Thus, the turbine system does not require an external boiler. The steam turbine system may be used in either an open system, where the steam passing through the turbine is not condensed and reused, or a closed system, where the steam passing through the turbine is condensed and reused.

21 Claims, 21 Drawing Sheets

(56) References Cited

U.S. PATENT DOCUMENTS

| | | | | |
|---|---|---|---|---|
| 3,771,313 | A * | 11/1973 | Kaiho | 60/216 |
| 3,977,952 | A * | 8/1976 | Knoevenagel et al. | 204/157.4 |
| 4,008,991 | A | 2/1977 | McAleer | |
| 4,057,736 | A * | 11/1977 | Jeppson | 290/1 R |
| 4,097,349 | A * | 6/1978 | Zenty | 204/157.46 |
| 4,165,614 | A * | 8/1979 | Yeh | 60/531 |
| 4,167,463 | A * | 9/1979 | Conrad | 204/157.41 |
| 4,226,369 | A * | 10/1980 | Botts et al. | 241/1 |
| 4,397,823 | A * | 8/1983 | Dimpfl | 204/157.41 |
| 4,543,484 | A * | 9/1985 | Meyerand et al. | 250/432 R |
| 4,549,053 | A * | 10/1985 | Haugh | 219/686 |
| 4,644,169 | A * | 2/1987 | Hunt | 250/432 R |
| 4,658,115 | A * | 4/1987 | Heath | 392/387 |
| 4,783,789 | A * | 11/1988 | Higgins | 250/432 R |
| 4,784,686 | A * | 11/1988 | Meek et al. | 204/157.43 |
| 5,341,576 | A * | 8/1994 | Tsutomu et al. | 34/263 |
| 5,801,497 | A * | 9/1998 | Shamoto et al. | 477/3 |
| 6,000,223 | A | 12/1999 | Meyer | |
| 6,012,286 | A | 1/2000 | Cantu | |
| 6,089,011 | A | 7/2000 | Shouman | |
| 6,173,564 | B1 | 1/2001 | Zachary | |
| 6,259,759 | B1 * | 7/2001 | Sakamaki | 376/305 |
| 6,282,894 | B1 | 9/2001 | Smith | |
| 6,586,757 | B2 * | 7/2003 | Melnychuk et al. | 250/504 R |
| 6,758,040 | B1 | 7/2004 | Canto | |
| 7,134,841 | B2 | 11/2006 | Montgomery | |
| 7,147,438 | B2 | 12/2006 | DePaoli | |
| 7,165,934 | B2 | 1/2007 | Reigl | |
| 7,191,597 | B2 | 3/2007 | Goldman | |
| 7,207,773 | B2 | 4/2007 | O'Clair et al. | |
| 7,223,065 | B2 | 5/2007 | Suter | |
| 7,254,951 | B2 | 8/2007 | Lockwood, Jr. | |
| 7,611,072 | B2 * | 11/2009 | Peters et al. | 239/136 |
| 2004/0040312 | A1 | 3/2004 | Hoffjann et al. | |
| 2006/0017026 | A1 * | 1/2006 | Hergenhan et al. | 250/504 R |
| 2006/0030450 | A1 * | 2/2006 | Kyle | 477/3 |
| 2007/0085044 | A1 * | 4/2007 | Hergenhan et al. | 250/504 R |
| 2007/0090304 | A1 * | 4/2007 | Jonkers et al. | 250/504 R |
| 2008/0116400 | A1 * | 5/2008 | Schmidt et al. | 250/504 R |
| 2009/0078560 | A1 * | 3/2009 | Savage | 204/157.41 |
| 2009/0127479 | A1 * | 5/2009 | Hosokai et al. | 250/504 R |
| 2009/0224181 | A1 * | 9/2009 | Abe et al. | 250/504 R |
| 2010/0264656 | A1 | 10/2010 | Flood | 290/52 |
| 2010/0294953 | A1 * | 11/2010 | Vaschenko et al. | 250/492.1 |
| 2011/0225948 | A1 * | 9/2011 | Valeev et al. | 60/39.821 |
| 2012/0080619 | A1 * | 4/2012 | Kleinschmidt | 250/504 R |
| 2012/0305810 | A1 * | 12/2012 | Ershov et al. | 250/504 R |
| 2014/0160450 | A1 * | 6/2014 | Loopstra et al. | 355/30 |

FOREIGN PATENT DOCUMENTS

| | | | | |
|---|---|---|---|---|
| JP | 2004-058205 A | | 2/2004 | |
| KR | 10-1999-0042575 | | 6/1999 | |
| WO | WO 2009066242 A2 * | | 5/2009 | G03F 7/20 |

OTHER PUBLICATIONS

International Patent Application No. PCT/US2009/036627 International Search Report and Written Opinion mailed Nov. 24, 2009.

JP 2004-058205 A English Language Machine Translation.

KR 10-1999-0042575 English Language Machine Translation.

Nozzle Design. [retrieved Jan. 12, 2009]. Retrieved from the Internet: <URL: http://exploration.grc.nasa.gov/education/rocket/nozzle.html>.

Partin, J. K. et al., "Investigation of Optical Technologies for Measuring Geothermal Fluid Properties", INL Research Presented at the 2002 Annual GRC Meeting in Reno, NV.

* cited by examiner

LASER FOR STEAM TURBINE SYSTEM

CROSS-REFERENCE TO RELATED APPLICATION

This application is the continuation of International Patent Application No. PCT/US2009/036627, filed Mar. 10, 2009, the entire disclosure of which is hereby incorporated by reference.

BACKGROUND

In view of global warming created by carbon dioxide ($CO_2$) emissions, there has been a movement to promote "greener" technologies that do not emit $CO_2$ or other greenhouse gases. The recent rise in fuel prices has further bolstered demand for alternate or "greener" energy sources, such as in hybrid electric vehicles. Typically, these "greener" systems rely on expensive and heavy electric motors in order to generate the required mechanical power. While electric motors provide significant benefits, such as regenerative braking in hybrid vehicles, there are a number of significant drawbacks to this technology. For example, the magnets in electric motors are normally expensive and very heavy. The added weight of the electric motors can reduce overall energy efficiency. Furthermore, electric motors at times are slower in response to provide the required immediate torque and thus are not able to provide the desired mechanical power when needed.

SUMMARY

The inventors discovered that this problem of producing highly-responsive mechanical energy in an environmentally friendly fashion is solved by immediately vaporizing liquid water with a laser within a nozzle to create a superheated steam that powers blades within a turbine. In comparison to electric motors, turbines are generally lighter. Further, the turbines are able to achieve both faster response at a higher torque and lower engine weight. By using liquid water or other environmentally friendly liquids to drive the turbine, the turbine can be used in an open type system, thereby eliminating the weight found in closed systems with external boilers, condensers, and their accompanying piping.

Some may initially find this approach of using a laser to drive a turbine to be counterintuitive because of the efficiency in converting laser energy to steam and ultimately mechanical turbine power. As the energy density of electrical power sources continue to improve (e.g., battery, hydrogen fuel cells, flywheel, etc.), the laser steam turbine approach becomes desirable under numerous conditions that require a lightweight, environmentally friendly, and/or portable source for highly responsive mechanical turbine power such as with an aircraft.

To that end, the inventors have developed a unique and inventive system in which a laser immediately vaporizes the water within the turbine itself in order to turn the turbine to generate the required mechanical energy. By vaporizing the water within the turbine rather than in an external boiler, a number of improvements can be achieved. For example, there is no heat loss by the steam cooling within the pipes or other equipment typically found in closed boiler systems. This in turn reduces the chance of undesirable condensation of the liquid forming within the turbine itself. By vaporizing the water within the turbine, the system can be an open system in which only the turbine and laser generator are required to produce the requisite mechanical energy. This reduces the weight of the overall system as well as allows the system to be relatively small and compact in comparison with other types of conventional steam turbine systems.

As noted before, it is undesirable that any type of liquid contact the turbine blades during operation because it can lead to wear on the turbine blades. This wear in turn can lead to the turbine being unbalanced which can lead to blade failure. With the inventors' proposed laser turbine design, the laser steam generator nozzle is in extremely close proximity or integral to the blades of the turbine before being vaporized. There is a significant danger that the liquid water may not completely vaporize, thereby having water droplets striking and damaging the turbine blades. The inventors created a unique laser steam generator nozzle that ensures complete boiling and rapid vaporization before exiting the nozzle. The nozzle is configured to internally conically focus on the stream of water and reflect the laser beam multiple times across the path of the liquid stream. The laser beam hits the liquid steam multiple times in concentric patterns, therefore ensuring complete vaporization of the water. With the internal reflection provided by this nozzle design, the highly-powerful laser beams are reflected back into the nozzle rather than exiting with the steam so as to prevent any blade damage or loss of energy. Additional means to prevent egress/escaping of liquid water may also be used.

To improve the energy efficiency of the system, the energy supplied to the powerful laser beams is adjusted to correspond to the steam demand. The laser uses only as much energy as necessary to vaporize the water stream and to produce steam. Similarly, the rate of water supply flow, temperature, and pressure into the laser steam generator nozzle are controlled to correspond to the steam demand.

These steam turbine systems that are smaller, lighter, and simpler in operation can be incorporated in many applications, particularly mobile applications in which steam turbines were previously too large. Such applications include cars, boats, airplanes, and trains. In contrast to traditional gas turbines that produce environmentally harmful fumes, the exhaust produced by this steam turbine system is a safe and environmentally friendly water vapor. To further enhance the implementation with these applications, the inventors recognized that the system weight could be further reduced without sacrificing the power output of the steam turbine system by externally acquiring the water used to produce steam from the environment as needed. This way, all of the water for the laser steam generator nozzle does not have to be carried and/or stored within the vehicle or platform. Instead, during operation, water is acquired externally from the environment or made up at the rate needed to produce steam. For example, the water waste product from a fuel cell is collected and used as the water supply to the steam turbine. Alternatively, the water is acquired from the environment surrounding the turbine system as needed, for example, from condensation in the air or water from a sea, lake, river, or ocean that the turbine operates near or on (in the case of a water vessel). As a result, this steam turbine system may also be combined with other energy generators to provide continuous reliable power, either as a back-up or supplemental power supply, particularly in mobile applications. These other energy sources include batteries, fuel cells, nuclear power, flywheel, and back-up or supplemental power for environmental sources such as solar power, wind power, or hydro-power.

Further forms, objects, features, benefits, advantages, and embodiments will become apparent from the detailed description and drawings provided herewith. For example, although the laser system has been described with reference to boiling liquid water, other types of liquids that vaporize can be used.

DETAILED DESCRIPTION

For the purpose of promoting an understanding of the principles of the invention, reference will now be made to the embodiments illustrated and specific language will be used to describe the same. It will nevertheless be understood that no limitation of the scope of the invention is thereby intended, such alterations and further modifications in the illustrated device, and further applications of the principles of the invention as illustrated therein being contemplated as would normally occur to one skilled in the art to which the invention relates.

One embodiment of the invention is shown in great detail, although it will be apparent to those skilled in the relevant art that some features that are not relevant to the present invention may not be shown for the sake of clarity. Generally, the nozzle vaporizes liquid water with a concentric laser array to create steam that powers blades within a turbine, eliminating the size and weight of an external boiler, condenser, and associated piping. The laser steam generator nozzle is an integral part of the turbine engine located just upstream of the blades.

Figure 1:
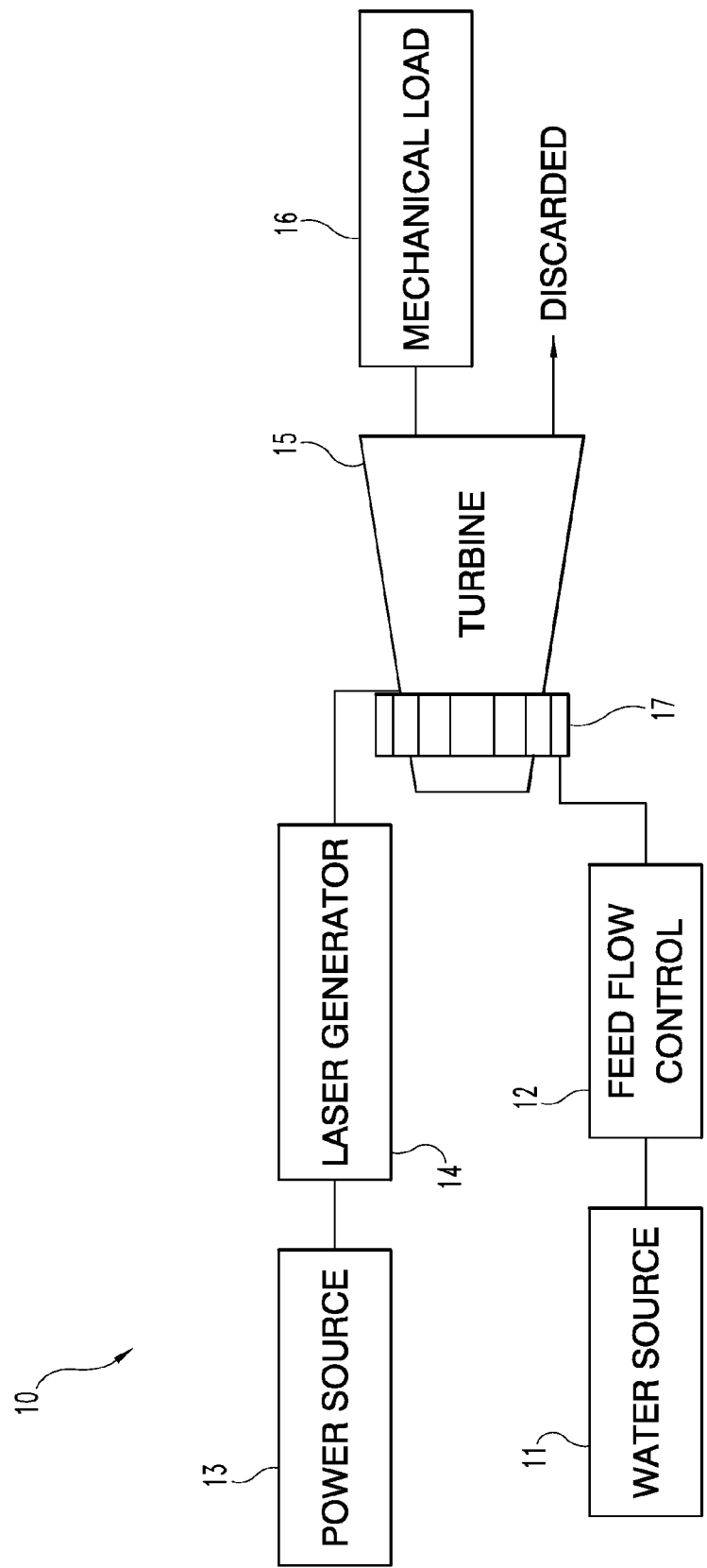
FIG. 1 is a block diagram of an open steam turbine system according to one embodiment.

FIG. 1 shows a block diagram of a steam turbine system 10 according to one embodiment. The system 10 includes a water source 11, a feed flow control 12 for water source 11, a power source 13, a laser generator 14, a turbine 15 which is rotated or powered by the steam, a mechanical load 16 powered by the turbine, and a laser nozzle array 17 that includes one or more laser nozzles. Although the turbine system is described as using water as the liquid medium that is vaporized by a laser to form steam that drives the turbine, it should be appreciated that other types of vaporizing liquids can be used. Nevertheless, the water vapor (steam) byproduct produced by this system 10 is environmentally friendly, and therefore, allows the system to be an open type system that, as will be explained below, allows the overall system 10 to be lighter (i.e., higher torque to weight ratio). The water can also be dyed or otherwise modified to promote absorption of the laser energy. For example, the water can include a dark or black dye so as to promote laser absorption when a visible light laser is used. Of course, different types of dyes or other absorptive chemicals can be used to absorb lasers at different wavelengths. The water source 11 supplies the liquid water to the turbine 15, and the flow of liquid water to the turbine is regulated by the feed flow control 12 which also controls pressure and temperature, which would typically be controlled just below the boiling point to minimize required laser energy. In one embodiment, the water source 11 is in the form of a water storage tank, but as will be recognized from the discussion below, the water source 11 can come from many different types of sources. The feed flow control 12 in one example includes a valve, pump, and/or electronics for regulating the water flow, such as sensors, processors, actuators, etc., but the feed flow control 12 can be configured differently in other examples to include other features, such as a preheater for the supplied water. Feed flow control 12 may be accomplished by adjusting the positioning of a valve in the water supply piping to the laser nozzle array 17 and/or by altering the speed of a pump feeding the water to the laser nozzle array 17. The feed flow control 12 is designed to ensure that an adequate supply of water is maintained such that the required output mechanical power from the turbine 15 is sustained. Further, the flow control 12 regulates the liquid water supply so that the liquid water is completely converted to steam within the nozzle. In one example, the flow control 12 supplies one or more continuous laminar streams of water to multiple laser steam generator nozzles 17, but the water can be supplied in other manners. As another example, the water can be supplied as a series of drops or pulses that are synchronized with laser pulses. The flow control 12 and laser generator 14 are designed to produce dry or superheated steam within the turbine. If saturated steam with water droplets impinge onto the blades of the turbine 15, erosion of the blades could occur. This in turn can result in rotor imbalance and failure of the turbine 15. As will be explained below, one of the many features of this laser steam turbine system is that the lasers completely vaporize the water within the steam generator nozzle 17 so as to avoid condensation and moisture carryover issues.

The power source 13 provides energy to power the laser generator 14. In one example, the power source 13 is a high energy density portable power source, such as a battery, fuel cell, flywheel, solar cell, portable generator, etc. With the power source 13 being portable, the system 10 can be used in numerous environments where a compact and lightweight source of highly responsive mechanical power is required, such as in vehicles, ships, aircraft, etc. The power source 13 in other examples can be a source that is less portable or not portable at all, such as electricity supplied from a power grid. The power from the power source 13 in turn causes the laser generator 14 to generate one or more concentric laser beams within each steam generator nozzle 17.

In one example, the one or more laser beams from the laser generator 14 are transmitted to the steam generator nozzle 17 via one or more fiber optic cables, but the laser beams can be transmitted in other manners, such as by being transmitted through the air, through one or more beam splitters, reflected from mirrors and/or transmitted through other types of optical devices, to name just a few examples. Within the laser steam generator nozzle 17, the laser beams vaporize or flash the water into steam. As the steam exits the nozzle, it impinges on and rotates the rotor's blades in the turbine 15, and the mechanical power created by rotation of the blades is then used to power some type of mechanical load 16. As will be appreciated, the mechanical power generated by the turbine 15 can be used in many situations, such as to drive the wheels of a vehicle, power a turbofan or propeller of an aircraft, power the screw of a submarine, etc.

As will be discussed at greater length below, the relationship of the laser steam generator nozzles 17 to the turbine blades can be configured in a number of manners. For instance, the turbine 15 can include an impulse type turbine, a reaction type turbine, or some combination thereof. In typical steam turbine systems, the steam is produced outside of the turbine because it was thought that producing steam in close proximity to the turbine blades would increase the danger of saturated or wet steam damaging the turbine blades. However, the inventors discovered that producing steam remotely created several disadvantages such as the steam cooling during transport so that energy was lost and condensation occurred. It was quite unexpectedly discovered that lasers could facilitate immediate vaporizing of water to steam on demand inside the steam generator nozzle. Due to the highly focused and controllable nature of lasers, the inventors found focused concentric laser beams reflected within the nozzle were able to consistently vaporize the water to produce dry (superheated) steam within the turbine 15 itself As will be explained below, other components have been developed by the inventors to further ensure the creation of dry steam within the turbine 15. It was also found that this ability to vaporize water with lasers within the nozzle facilitated tight regulation of steam production which in turn allowed the mechanical power output from the turbine 15 to be accurately controlled and changed rapidly to obtain optimal power output. In other words, this configuration allowed instantaneous throttling and control of the turbine 15. This occurs by regulating the water flow into the turbine 15 with the flow control 12 and the strength of the lasers hitting the water stream. Unlike the illustrated system 10, traditional boiler-based systems are unable to quickly and efficiently throttle power production in such a manner due to the inherent delay created by using boilers.

The system 10 illustrated in FIG. 1 is commonly referred to as an open type system in which the steam from the turbine 15 is exhausted to the outside environment. In certain situations, the steam exhaust can also provide thrust for vehicles, aircraft, watercraft, etc. In contrast to closed type systems in which the exhaust steam is condensed and recirculated, open type systems are more compact and lighter because the equipment required for condensing the water is eliminated. This open system design also allows steam turbines to be used in situations where turbine power might not be traditionally available. The use of water allows the system 10 to be an open one, because the exhausted steam is environmentally friendly.

Figure 2:
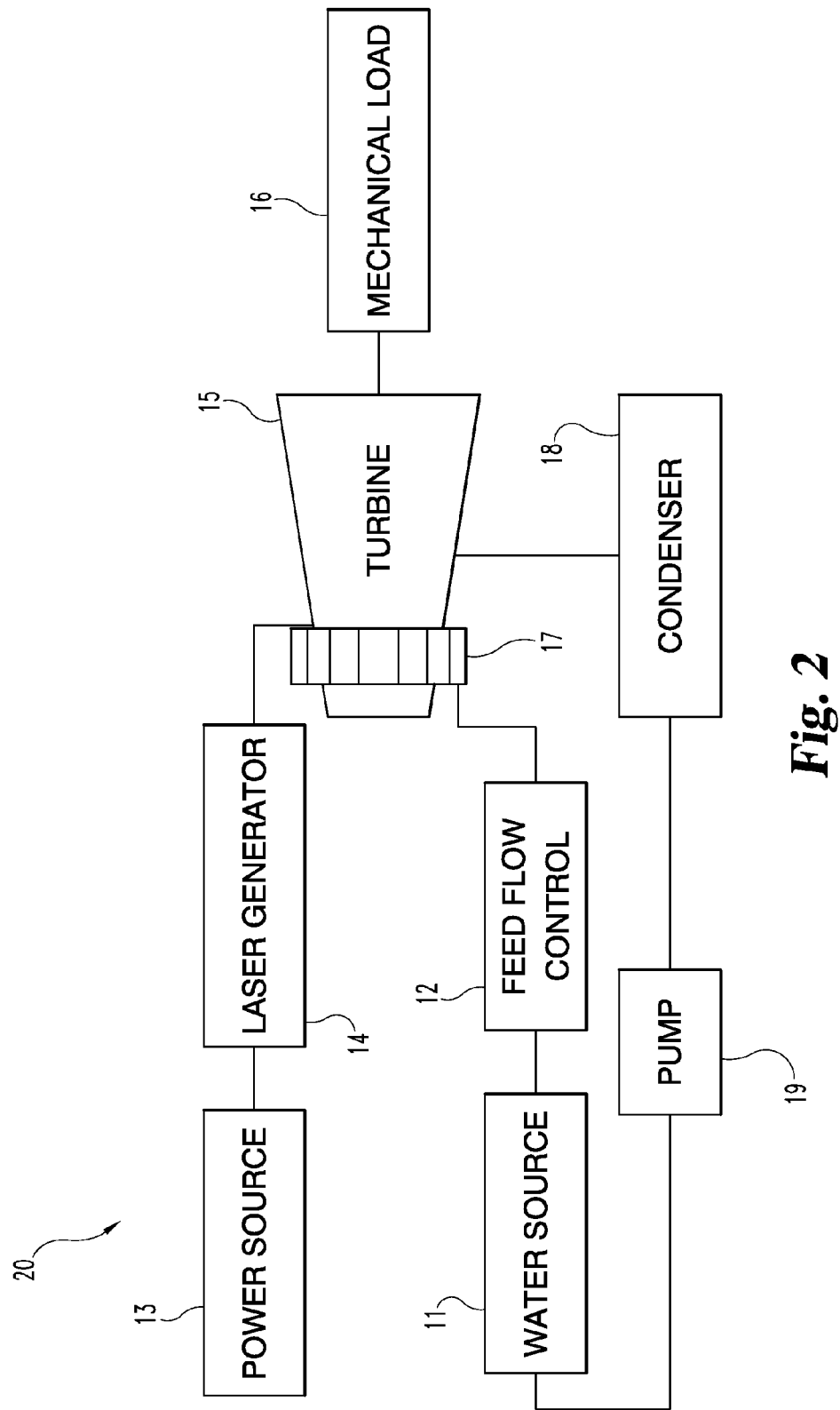
FIG. 2 is a block diagram of a closed steam turbine system according to another embodiment.

Although open type systems provide a number of noteworthy benefits, a number of features can be adapted for use in closed type systems in which the water is recirculated. FIG. 2 is a diagram of one such example of a closed system 20. Like the open system 10 in FIG. 1, the closed system 20 in FIG. 2 includes the water source 11, feed flow control 12, power source 13, laser generator 14, turbine 15, mechanical load 16, and laser steam turbine nozzles 17 of the type described above. But the system 20 in FIG. 2 further includes a condenser 18 that collects and condenses the steam exhausted from the turbine 15. A pump 19 pumps the water condensed at the condenser back to the water source 11 where the water can again be fed to the turbine 15. Although the closed system 20 includes condenser 18 and additional equipment resulting in greater weight, this recycling of the water assures the availability of water for driving the turbine 15.

Figure 3:
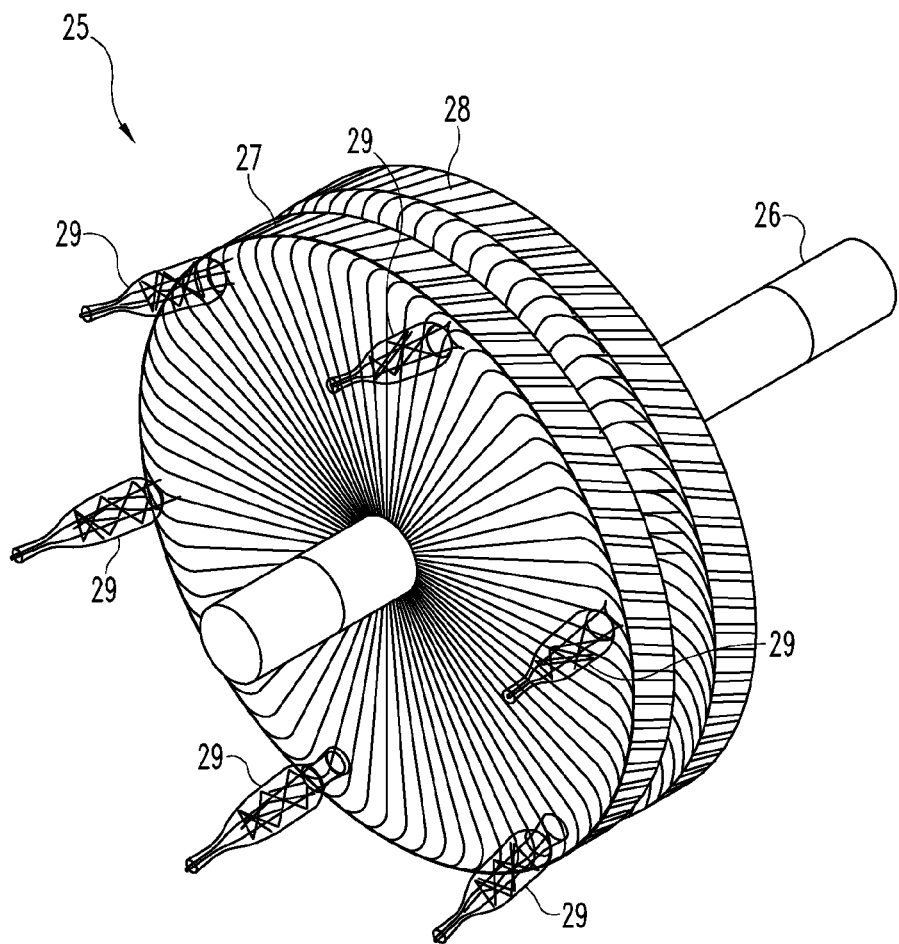
FIG. 3 is a perspective view of a turbine according to an embodiment.
Figure 4:
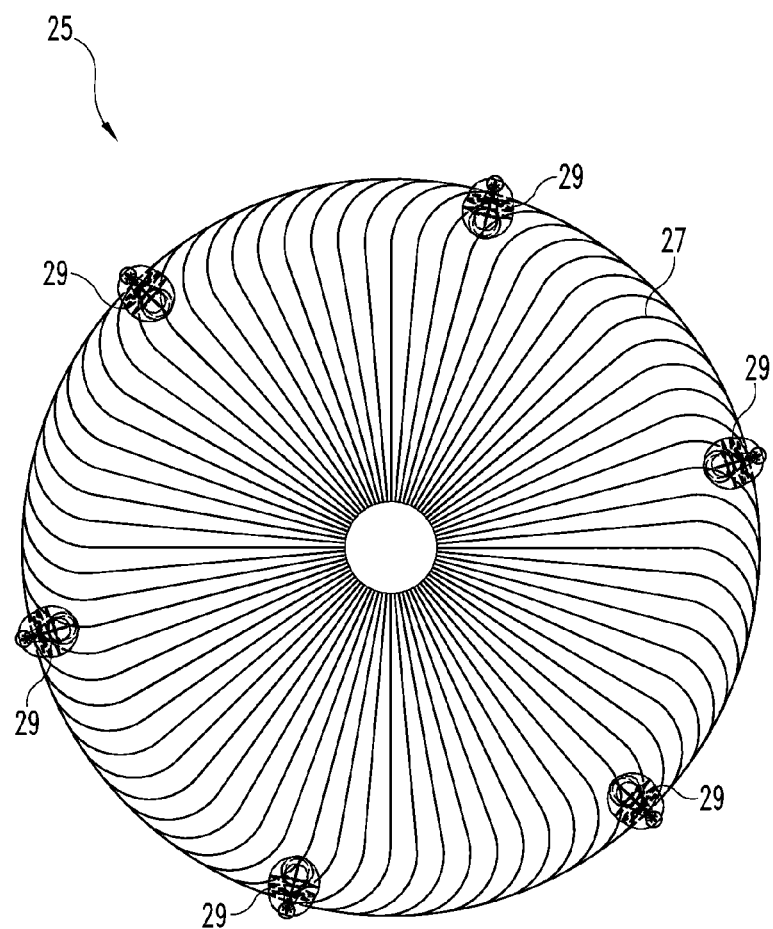
FIG. 4 is a front elevational view of the FIG. 3 turbine.
Figure 5:
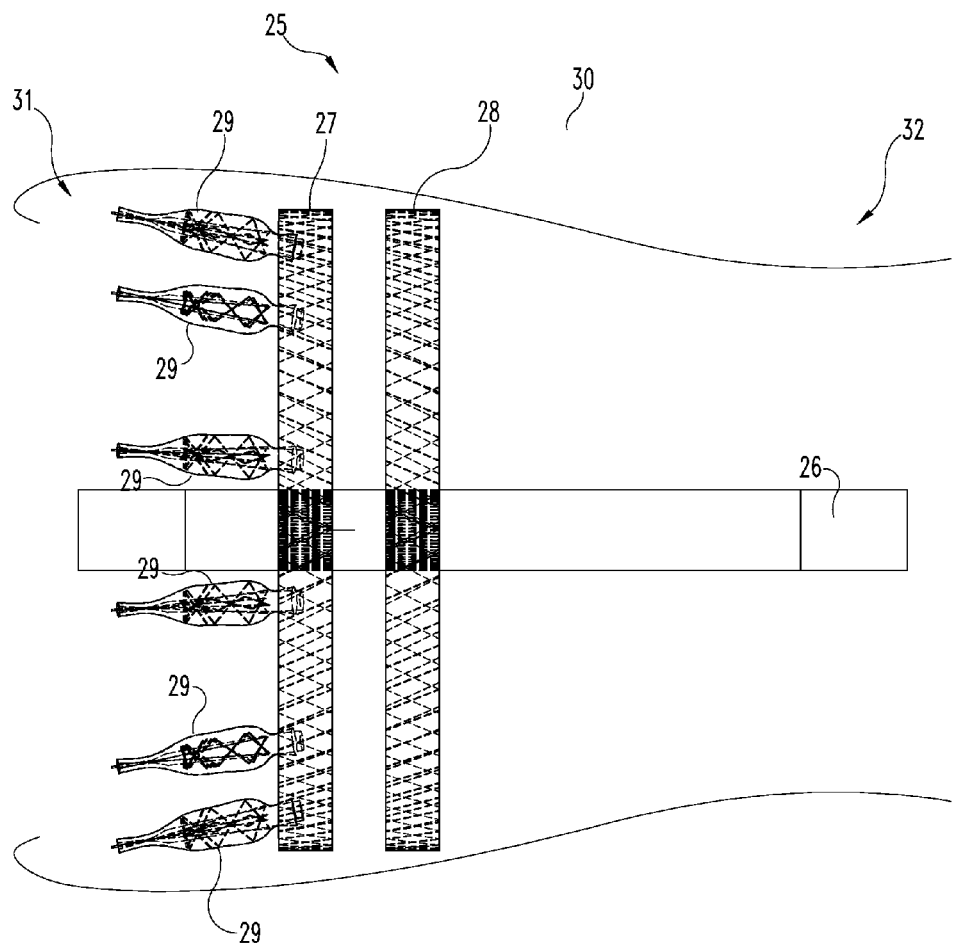
FIG. 5 is a top elevational view the FIG. 3 turbine.

As noted before, the turbine 15 can come in many forms. For example, the turbine 15 can include bladed type turbines and/or bladeless type turbines, which are sometimes called Tesla turbines. One example of a turbine 25 that can be incorporated into the systems described herein is illustrated in FIGS. 3, 4, and 5. FIG. 3 generally shows a perspective view of a rotor assembly used in the turbine 25. As can be seen, the rotor assembly of the turbine 25 includes an output shaft 26, a first stage of turbine blades 27 attached to output shaft 26, a second stage of turbine blades 28 attached to output shaft 26, and one or more laser steam generator nozzles 29 for producing steam. The shaft 26 is configured to directly or indirectly supply the output mechanical power from the turbine 25. For example, the shaft 26 can be directly secured to a mechanical load, such as a wheel, a propeller, turbofan, etc., or the shaft 26 can be indirectly coupled to the mechanical load through a transmission, gearing, etc. The blades 27, 28 can come in many forms and can operate as reaction or impulse turbine blades. Of course, the turbine 25 can include other components found in turbines, such as stator blades, speed governors, bearings, and seals, to name just a few examples. The second stage of turbine blades 28 is attached to output shaft 26 on the side opposite the first stage 27. The second stage 28 of blades is positioned downstream from the first stage 27 such that the steam produced by the nozzles 29 travels through the first stage 27 and then through second stage 28. Other embodiments can have fewer or more stages than is illustrated. Having multiple stages enhances the efficiency of the steam turbine system because the later stages remove energy from the steam that was not removed by the earlier stage to turn the same output shaft. Thus, more energy is removed from the steam than by a single stage alone.

As can be seen in FIGS. 3 and 4, the turbine further includes one or more laser steam generator nozzles 29 that create the steam for turning the blades 27, 28. The water source 11 via the flow control 12 supplies the water to the nozzles 29, and the laser generator 14 supplies the laser beams to the nozzles 29 for vaporizing the water. In the illustrated embodiment, multiple nozzles 29 are arranged around and direct steam into the first stage of turbine blades 27, and the nozzles 29 are oriented generally perpendicular to first stage 27. To avoid creating uneven forces across the first stage 27, the nozzles 29 are arranged uniformly around the first stage turbine blades 27 in the illustrated example. For example, the six (6) nozzles shown are each approximately sixty (60) degrees apart. Additionally, each laser steam generator nozzle 29 has a corresponding nozzle 29 one hundred and eighty (180) degrees from it to avoid unbalancing the first stage 27. In other embodiments, the nozzles 29 can be arranged in a non-uniform manner or in other orientations. To promote cooling by the air inducted into the turbine 25, the nozzles 29 can be spaced apart, but in other examples, the nozzles 29 can be packed closely together. It should be recognized that more or less nozzles 29 can be used in other embodiments, like one or seven nozzles 29.

The laser steam generator nozzles 29 are designed to ensure that dry (super heated) steam is produced such that the water is efficiently vaporized inside the turbine 25 with very little loss of energy. Looking at FIG. 5, the turbine 25 has a casing or housing 30 in which the nozzles 29 and the rotor assembly is disposed. In the illustrated example, the housing 30 includes an inlet opening 31 for the intake of air and an outlet or exhaust opening 32 for discharging steam. Again, the nozzles 29 are positioned inside the housing 30 so that the vaporizing of the water in the nozzle occurs in close proximity to the blades 27, 28 so as to minimize heat loss. During operation, steam from the nozzles passes through first stage 27 and second stage 28 turbine blades, causing the output shaft 26 to rotate. In the illustrated embodiment, the housing 30 is open such that the turbine 25 can be used in an open type system, but in other variations, such as for a closed system, the housing 30 can be closed.

Figure 6:
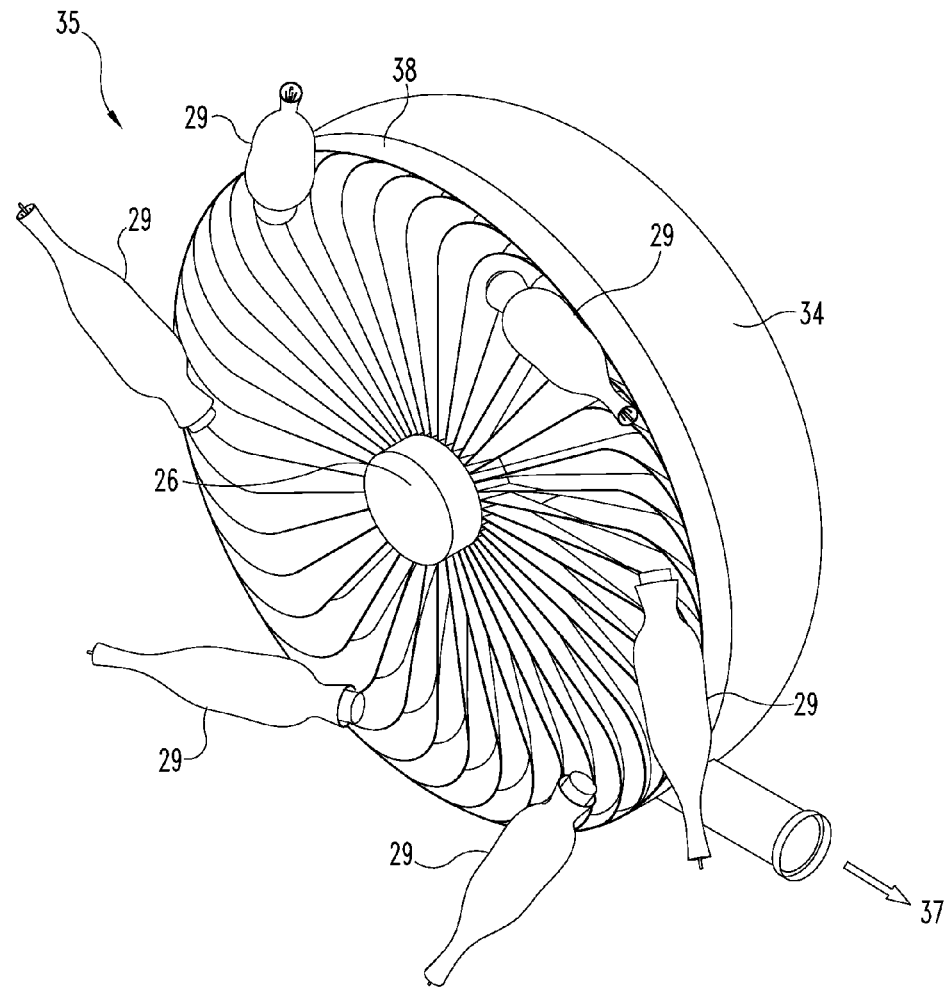
FIG. 6 is a perspective view of a turbine according to another embodiment.
Figure 7:
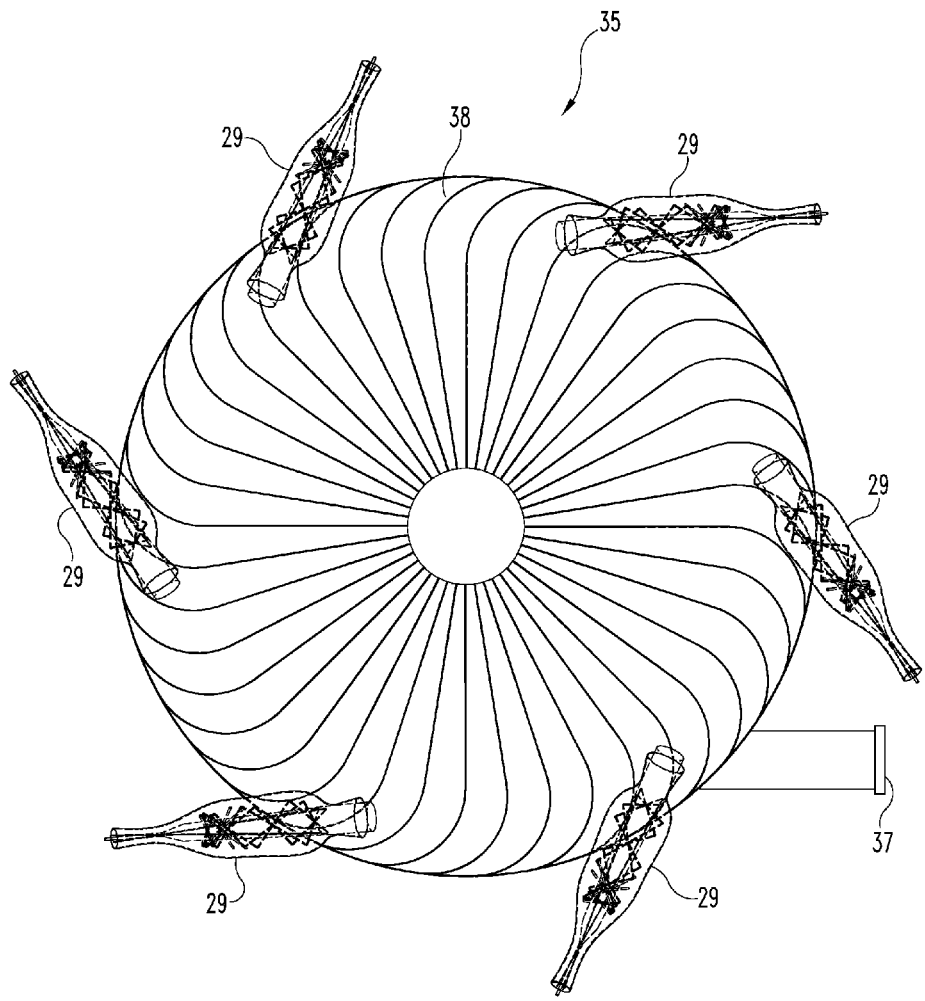
FIG. 7 is a front elevational view of the FIG. 6 turbine.
Figure 8:
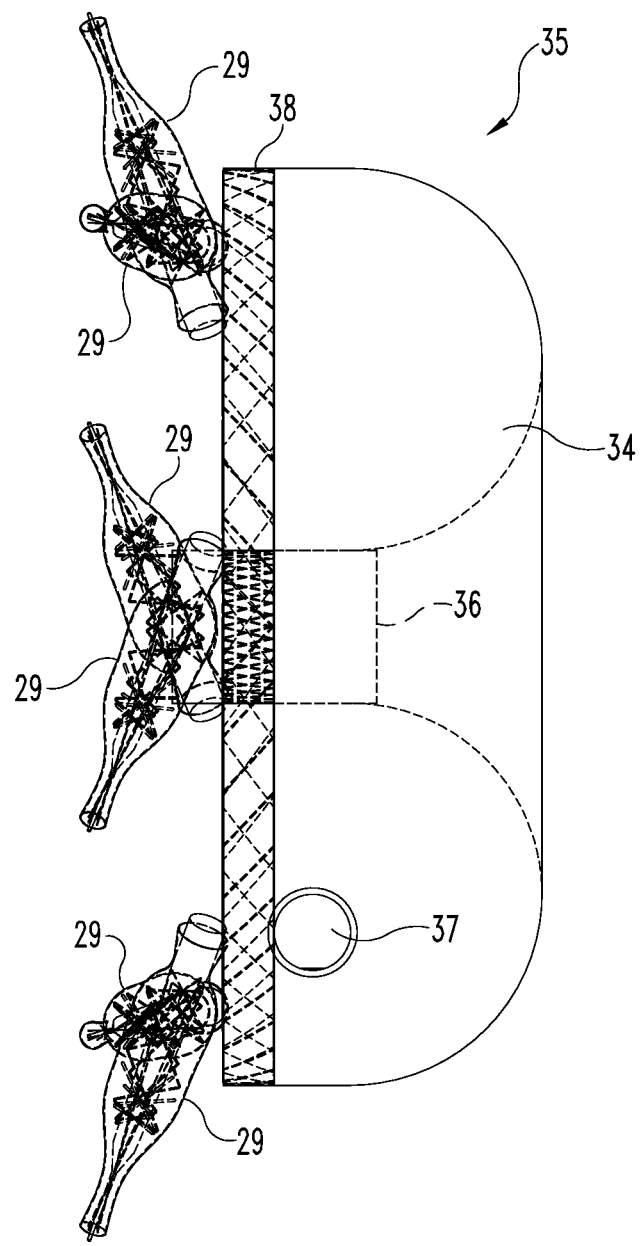
FIG. 8 is a top elevational view of the FIG. 6 turbine.

A steam turbine 35 according to another embodiment is illustrated in FIGS. 6, 7, and 8. As can be seen, the turbine 35 in FIG. 6 shares a number of components in common with the one illustrated in FIG. 3. For the sake of brevity and so as to avoid being repetitive, these common features will not be discussed in great detail again, but please refer to the previous discussion of these features. Like before, the turbine 35 has the output shaft 26 and nozzles 29. Unlike before, the turbine 35 includes a first stage 38 of blades and has a vapor cavity 34 for collecting and exhausting the steam through an exit opening 37. The laser steam generator nozzles 29 are arranged around and in close proximity to the turbine blades for producing and directing steam through first stage 38. In this embodiment, nozzles 29 are oriented at an oblique angle relative to turn turbine blades 38. By angling the nozzles 39 at an oblique angle, the steam provides a greater force to turbine blades 38 in the direction of rotation. Such an arrangement may be beneficial for a pelton-style turbine. After passing through the turbine blades 38, the steam enters the steam vapor cavity 34 and then exits the turbine through the exit 37. This exited steam can be discarded or condensed and returned to the steam turbine system as discussed above regarding the open 10 and closed 20 systems.

Figure 9:
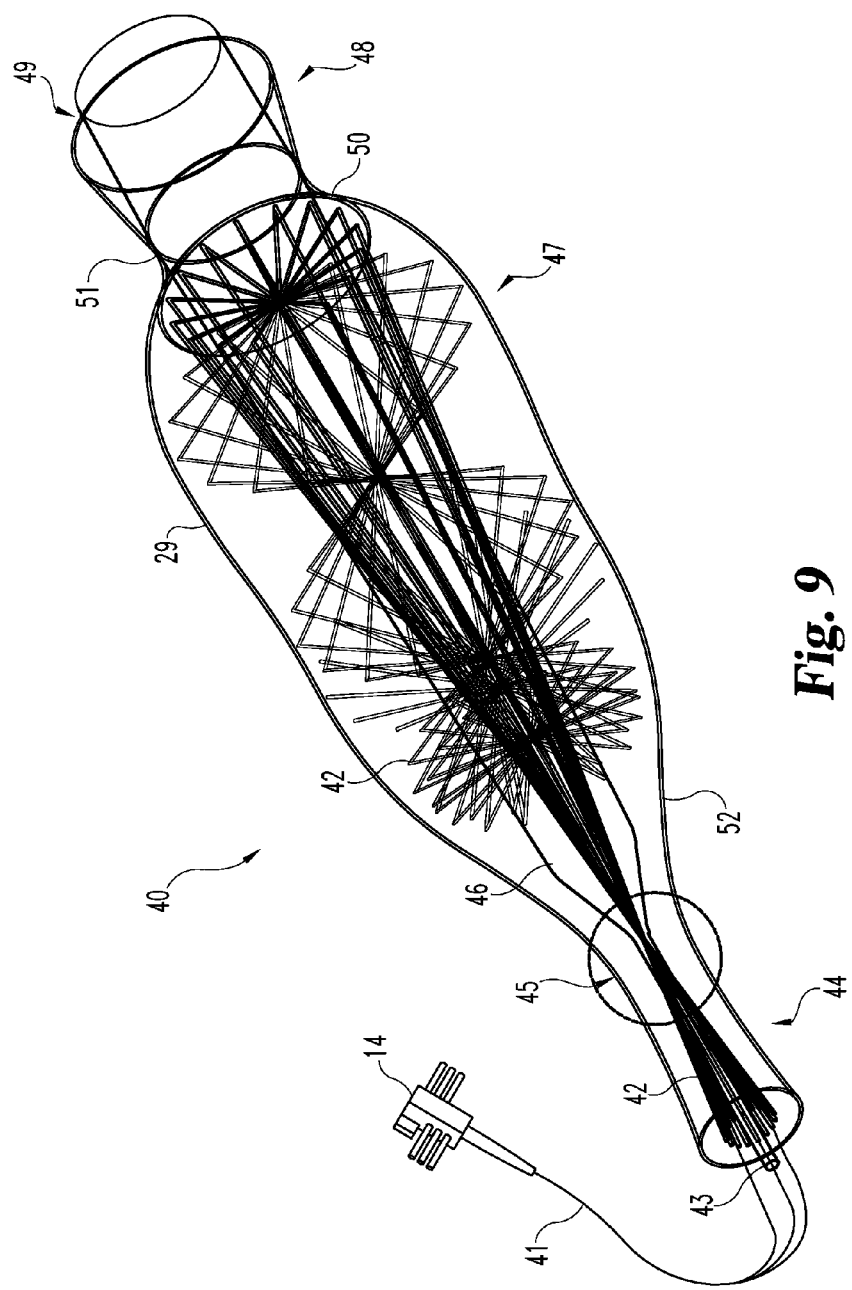
FIG. 9 is a perspective view of a nozzle used in the FIG. 3 and FIG. 6 turbines.
Figure 10:
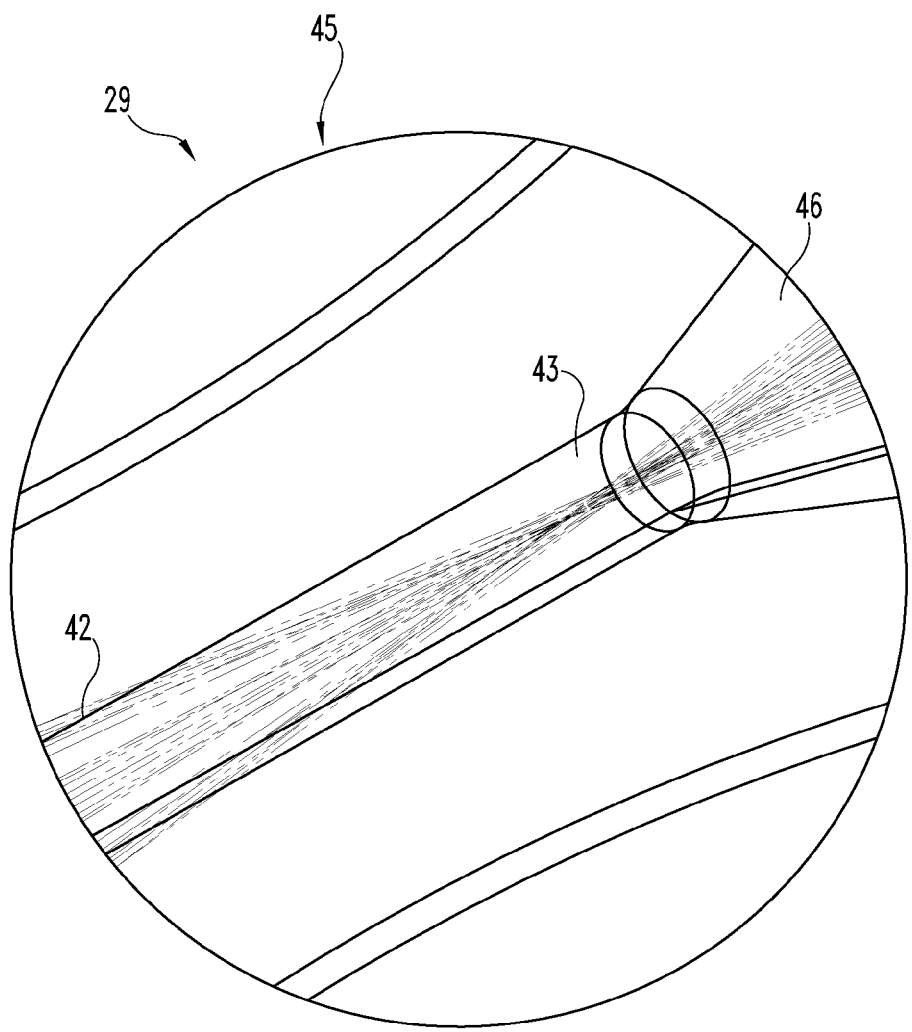
FIG. 10 is an enlarged view of the FIG. 9 nozzle which shows the laser beams intersecting the stream of water to be boiled.

As alluded to before, the laser steam generator nozzles 29 are designed to concentrate the laser energy so as to ensure complete vaporization of the water. This in turn reduces the risk of blade erosion caused by saturated steam and water droplets striking the blades. The nozzles 29 are also designed to reflect and contain the laser energy to prevent laser energy from escaping and damaging the turbine, other systems, and/or individuals. The inside surface of the nozzle is polished to a mirror finish to allow laser reflection. The nozzle walls are cooled by incoming water so as to pre-heat the water. One example of a nozzle system 40 that includes the nozzle 29 and the laser generator 14 will now be described with reference to FIGS. 9, 10, 11, 12, and 13. Looking at FIG. 9, the laser generator 14 has one or more optical fibers 41 that transmit the laser energy to the interior of the nozzle 29. One or more laser beams 42 radiate from the optical fibers 41 inside the nozzle 29 in a conical focused manner. The stream of water from the water source 11 and feed control 12 is identified by reference numeral 43. The nozzle 29 has a supply section 44 where the laser beams 42 and water 43 are introduced to the nozzle 29. As can be seen, the supply section 44 slightly tapers towards a primary focal point section 45 of the nozzle 29. At the focal point section 45, the laser beams 42 converge at the water stream 43 so as to initiate vaporizing of the water, as is depicted in FIG. 10. Reference numeral 46 represents the jet of steam (dry or wet) created by the water stream 43 being vaporized by the laser beams 42 at the section 45. From the focal point section 45, the nozzle 29 expands to a vaporization chamber 47 so as to somewhat coincide with the expansion of the steam jet 46. While not the same, the vaporization chamber 47 is somewhat analogous to a combustion chamber on a conventional liquid chemical rocket engine. The nozzle interior wall 47 is configured to internally reflect the laser beams 42. In one example, the interior of the nozzle 29 at the vaporization chamber 47 is metalized (i.e., made into a mirror) in order to reflect the laser beams 42. In another example, the refractive index of the materials used in the nozzle 29 are selected to cause internal reflection within the interior of the nozzle 29, but it is envisioned that the reflection can be facilitated in other manners. The reflection of the laser beams 42 within the nozzle 29 can be generally specular (i.e., mirror-like) or diffuse in nature. In the illustrated embodiment, the entire interior of the nozzle 29 is reflective, but in other embodiments, sections of the nozzle 29 can be not reflective (i.e., transparent and/or absorptive in nature).

Figure 11:
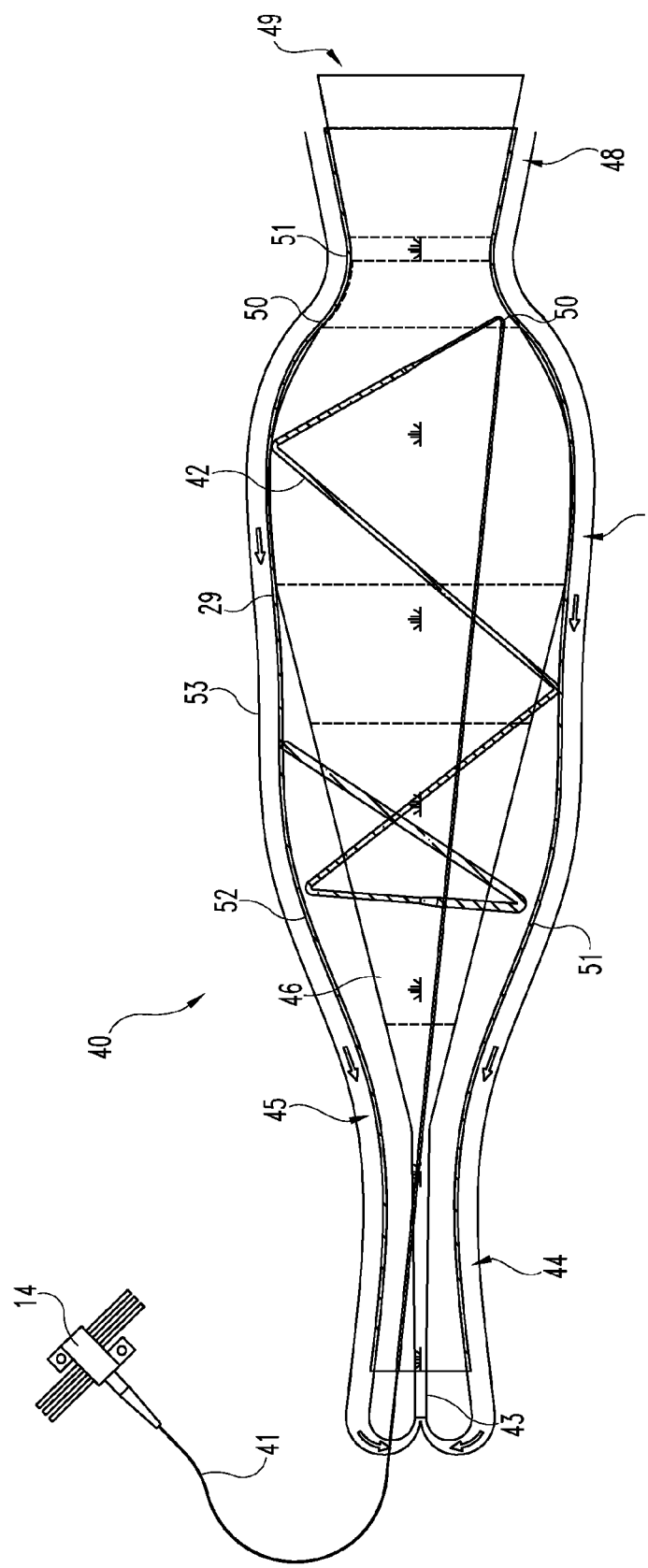
FIG. 11 is a cross-sectional view of the FIG. 9 nozzle that shows the path of a single laser beam.
Figure 12:
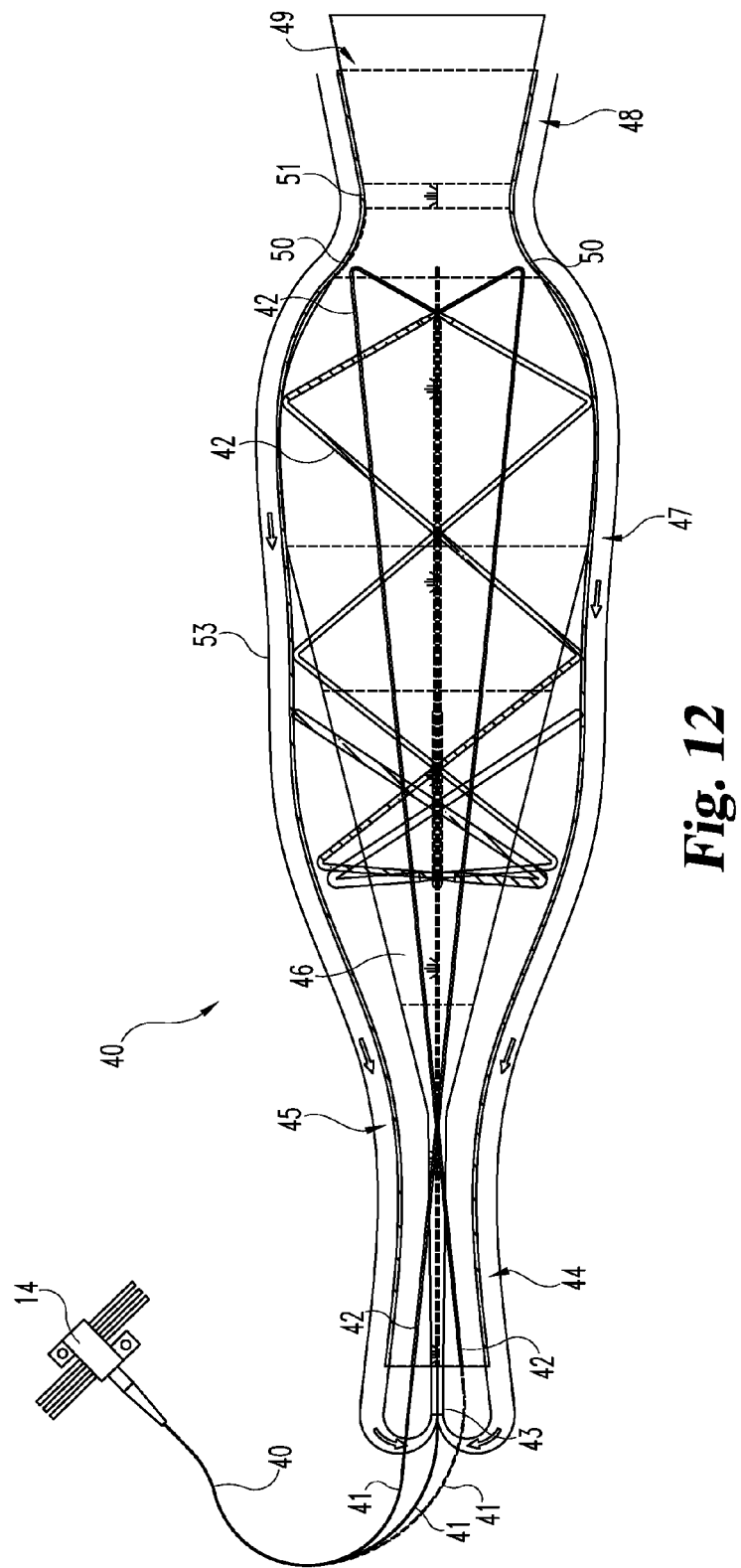
FIG. 12 is a second cross-sectional view of the FIG. 9 nozzle that shows the path of two laser beams.

The nozzle 29 in the illustrated embodiment generally has a converging-diverging nozzle design. Opposite the supply section 44, the nozzle 29 has an exhaust or diverging section 48 with an exhaust opening 49 through which the steam 46 is discharged to drive the turbine blades. In the illustrated example, the exhaust section 48 generally has a diverging, conical shape, but the exhaust section 48 can be shaped differently in other embodiments. Between the exhaust 48 and vaporization chamber 47, the nozzle 29 has an angled or converging wall section 50 angled to reflect the laser beams 42 back inside the nozzle 29. A throat 51 connects the converging 50 and diverging 48 sections of the nozzle 29. FIG. 11 shows a travel path of a single laser beam 42 within the nozzle 29, and FIG. 12 illustrates the travel path for multiple conical laser beams 42 within the nozzle. In operation of the illustrated embodiment more than two laser beams are used, but the limited number of laser beams depicted in the drawings are shown so that the paths can be easily viewed. In other embodiments, a single laser beam 42 can be used to vaporize the water. From the converging wall section 50, the laser beams 42 progressively reflect back towards the section 45 of the nozzle 29. By reflecting in such a manner, the portion of laser beam 42 with the most energy (after the part that initially contacts the stream 43) reflects across the stream 43 near the exhaust section 48 so that any remaining liquid in the stream 43 is vaporized as well as to further heat the steam 46 before being discharged. Between the section 45 and the vaporization chamber 47, the nozzle 29 has a transition section 52 with a frustoconical shape that is angled to contain the laser beams 42 within the nozzle 29. Of course, the laser beams 42 can reflect more times than is shown.

During operation, the stream of water 43 enters the nozzle 29 at the supply section 44. The water can be pre-heated before being supplied, such as by flowing through a jacket 53 of the nozzle 29 (as is indicated by the arrows in FIGS. 11 and 12). The lasers beams 42 are angled to form a cone-like shape with a focal point on the stream of water. In the section 45, the resulting cone of the laser beams 42 is focused to form a primary point of intersection with the stream 43, as is depicted in FIG. 10. At this point, the laser beams 42 vaporize the water, which in turn creates an expanded jet of steam 46. The now diverging laser beams 42 reflect from the converging wall section 50 near the throat 51 of the nozzle 29 (FIGS. 11 and 12). The laser beams 42 continue to internally reflect inside the nozzle 29 such that the beams 42 cross the path of the steam 46 and further vaporize any remaining water droplets multiple times to further heat and vaporize the water. This helps to ensure that dry (superheated) steam is produced and there is no liquid water carryover into the turbine. To help cool the angled wall 50 where the laser beam 42 is initially reflected, a portion of the cone of steam 46 (and/or liquid water) is configured to contact the angled wall 50. This helps to prevent overheating of the nozzle 29 at the angled wall 50. The generated steam passes through the discharge section 48 toward the turbine blades. The discharge section 48 imparts the desired pressure velocity steam characteristics of the steam exiting nozzle 29. As should be appreciated, the linear type design of the feed of the water stream 43 and the laser beams in the nozzle 29 helps to impart the impulse or velocity of the water stream 43 into the steam 46.

Figure 13:
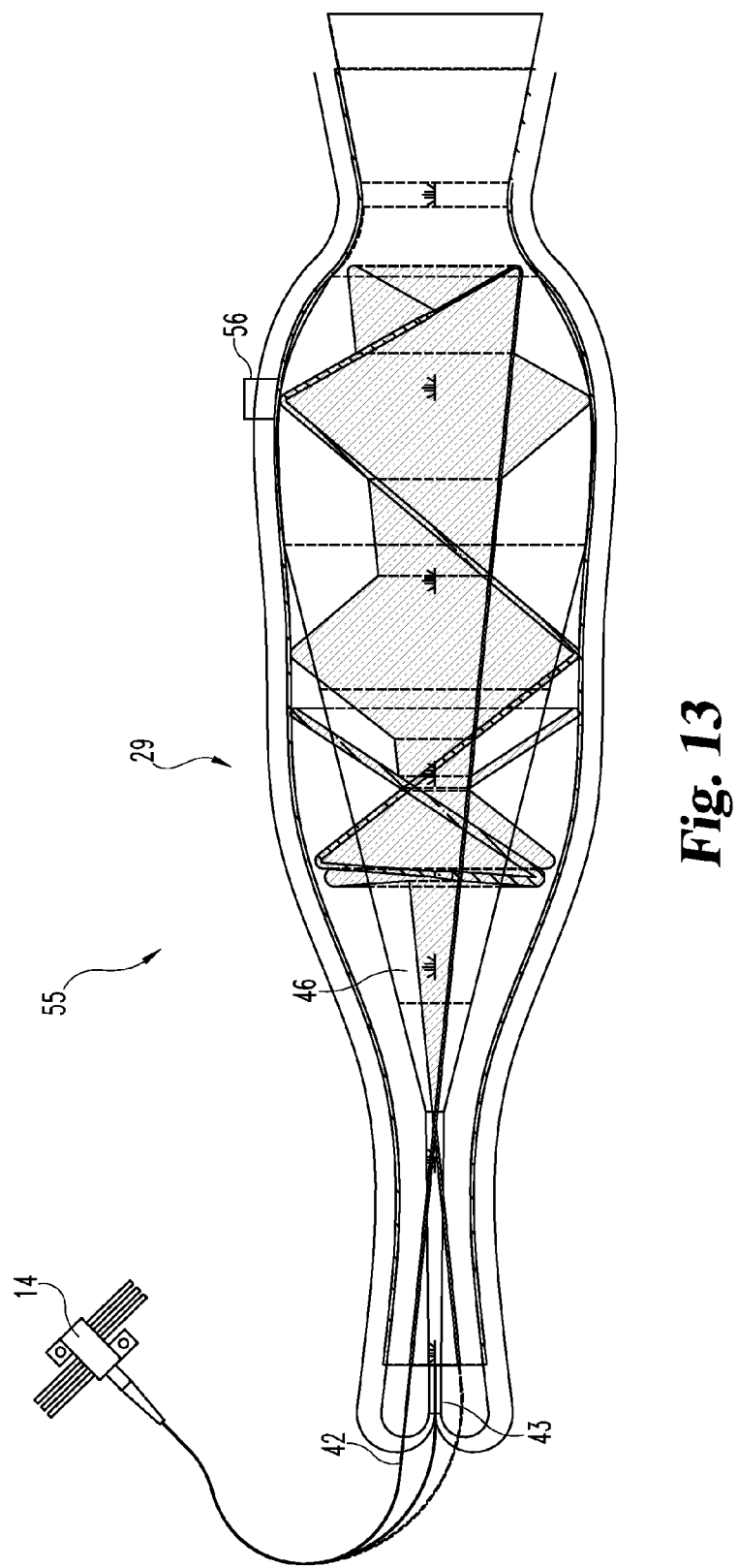
FIG. 13 is a cross-sectional view of a nozzle that internally reflects within the fluid stream according to another embodiment.

FIG. 13 illustrates a nozzle system 55 according to another embodiment. As can be seen, the system 55 in FIG. 13 is very similar to the one illustrated in FIG. 9, and common features will not be described again in great detail. Unlike the previous embodiment, the nozzle 29 further includes a laser sensor 56 that senses one or more properties of the laser beam 42 that passes through the steam 46 in order to determine the properties of the steam 46, such as the amount of liquid water present. Based on the properties sensed, the power of the laser beams 42 generated by the laser generator 14 and/or the flow of the water stream 43 can be adjusted, such as for example to ensure that dry or superheated steam is produced and/or to conserve energy. To further facilitate vaporization of the water, the laser beams 42 in the illustrated embodiment form a continuous conical laser curtain so that the steam 46 and any residual liquid water pass through the lasers on multiple occasions. In other words, a solid wall of laser beams 42 is formed through which the water stream 43 and steam 46 pass.

Figure 14:
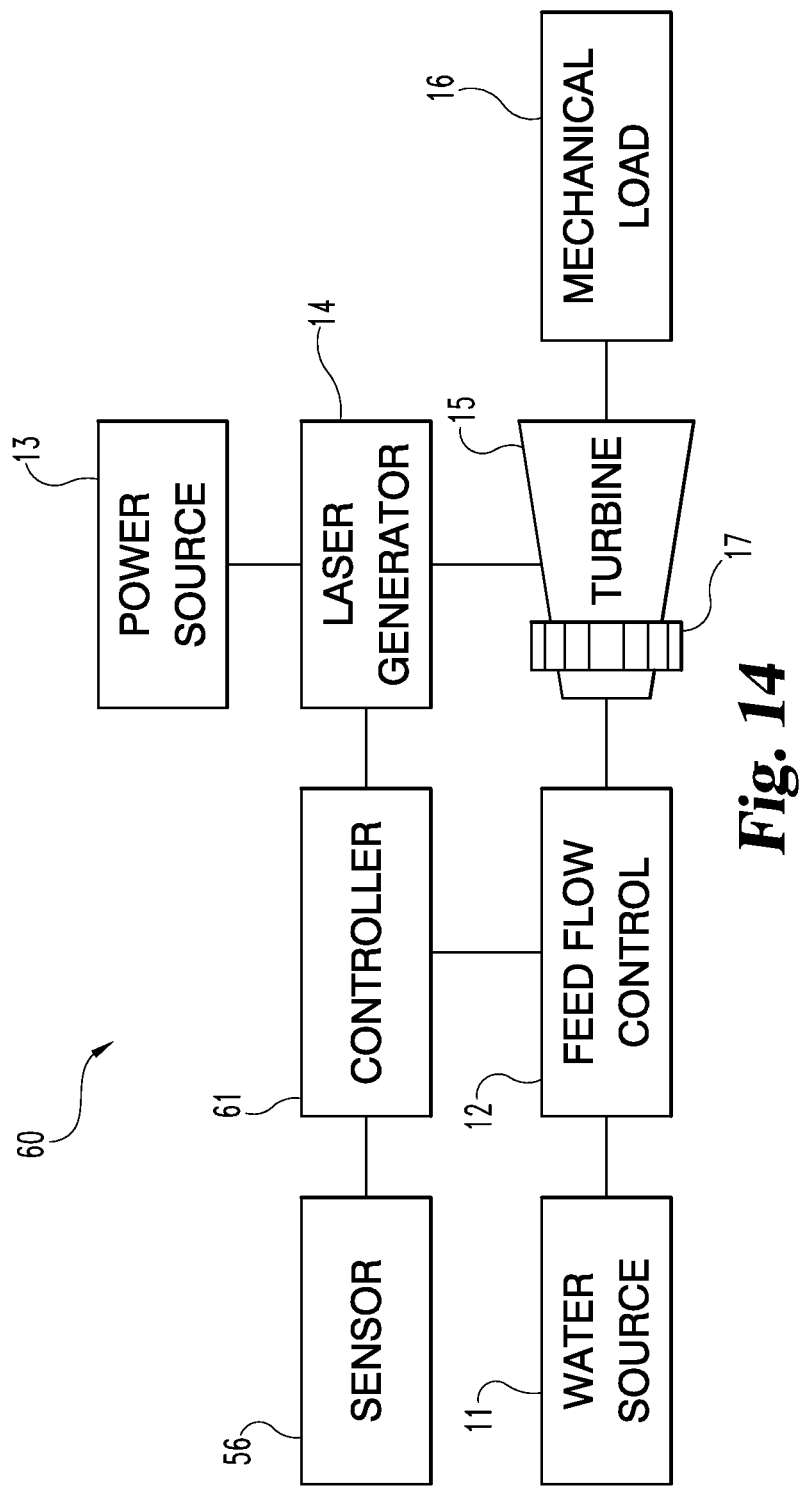
FIG. 14 is a block diagram of the control system for a steam turbine system according to one embodiment.

FIG. 14 illustrates a control system 60 that can be used in conjunction with the FIG. 13 system 55 so that vaporization of the liquid water occurs efficiently. As can be seen, the FIG. 14 system 60 shares a number of components in common with the systems illustrated in FIGS. 1 and 2, such as the water source 11, feed flow control 12, power source 13, laser generator 14, turbine 15, mechanical load 16, and the nozzle array 17 having one or more laser steam nozzles 29. For the sake of brevity and clarity, these common components will not be discussed at length again. The system 60 in FIG. 14 further includes one or more of the sensors 56 from FIG. 13 operatively coupled to a controller 61. The controller 61 in turn is operatively coupled to the laser generator 14 and the feed flow control 12. As noted before, the sensors 56 measure the residual intensity and/or other properties of the laser beams 42 (e.g., frequency, polarity, etc.) as the beams vaporize the water inside the nozzles 29. Based on the data collected from the sensors 56, the controller 61 controls the flow of water to the turbine 15 via the feed flow control 12 and the laser energy supplied to the nozzles 17 via the laser generator 14. For example, when the controller 61 through the sensor 56 detects that the laser intensity is low, which can be indicative of excessive liquid water in the steam 46, the controller 61 can reduce the water supply to the turbine 15 through the flow control 12 and/or increase the laser energy supplied to the turbine 15 through the laser generator 14 so as to make the steam drier. Conversely, if the laser intensity sensed by the sensor 56 is too high, which may indicate that laser energy is being wasted, the controller 61 can increase the water supply through the flow control 12 and/or decrease the laser energy supplied through the laser generator 14 so as to generally create an optimal mix of water and laser energy. In a similar fashion, the controller 61 can be used to throttle the turbine 15 so as to maintain, increase, or decrease the mechanical power provided by the turbine. The controller 61 can receive data from other sources in order to control the operation of the turbine 15 as well.

These steam turbine systems may be used in combination with other power generators. For example, the system can be used in a hybrid system in which the mechanical power from the turbine 15 supplements the power provided by another source, such as an electric motor, or vice-versa. For instance, the turbine can act somewhat like a turbo-charger in a hybrid electric vehicle so as to provide quick acceleration until cruising speed is reached at which point the electric motors maintain the velocity of the vehicle. The relatively light turbine provides the requisite power for acceleration which in turn allows lighter electric motors to be used. In still yet another example, the turbine supplements the power provided by an internal combustion engine. With this hybrid system, the supplied mechanical power can be efficiently supplied by changing the power source depending on the operational conditions. When the conditions change, the source for mechanical power can change as well. Thus, the most efficient power system under a particular condition carries most, if not all, of the load.

Figure 15:
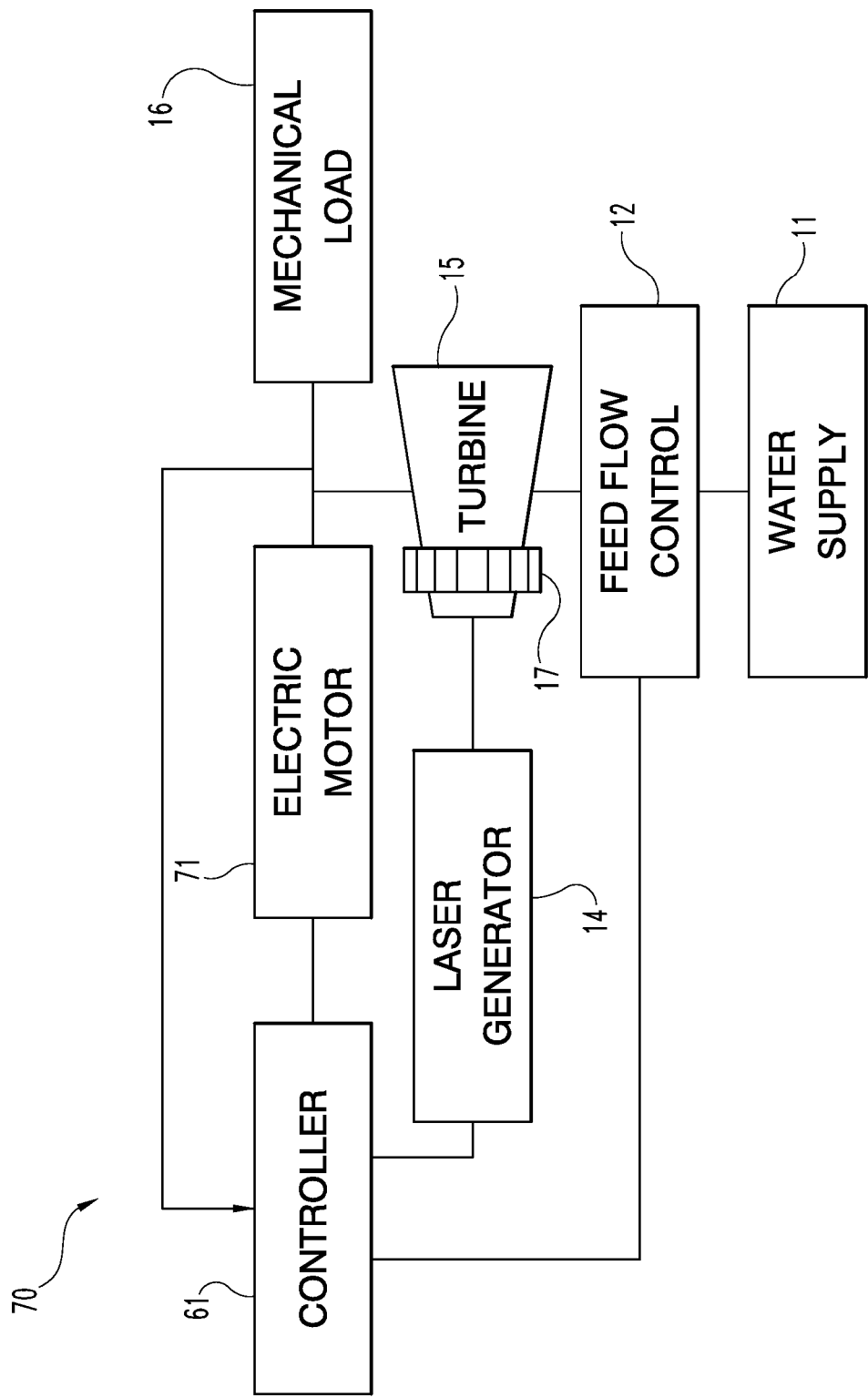
FIG. 15 is a block diagram of a control system for a hybrid electric motor/steam turbine system according to one embodiment.

An example of such a hybrid system 70 is illustrated in FIG. 15. The system 70 includes several components in common with the previously discussed systems, like the water supply 11, flow control 12, laser generator 14, controller 61, mechanical load 16, and the array 17 of one or more nozzles 29. The system 70 further includes an electric motor 71 that in conjunction with the turbine 15 supplies mechanical power for the mechanical load 16. The laser generator 14 and the electric motor 71 can receive power from the same power source or separate power sources. In the illustrated embodiment, the controller 61 is operatively coupled to the flow control 12, laser generator 14, electric motor 71, and the mechanical load 16, but the controller 61 can be operatively coupled to other components as well. The controller 61 receives sensor or other feedback information from the electric motor 71, mechanical load 16, turbine 15 as well as components of the system 70, and based on this information, the controller 61 controls the operation of the system 70. For example, the controller 61 can activate the turbine 15 to supply power to the mechanical load 16 during acceleration through the laser generator 14 and flow control 12. Once the desired speed is reached, the electric motor 71 can take over powering the mechanical load 16, and the controller 61 can power down the turbine 15, if so desired. In another example, the turbine 15 and the electric motor 71 can power the mechanical load at the same time or in an alternating fashion. In still yet another example, power from regenerative braking is used to power the laser generator 14 for the turbine 15.

One issue that has been a concern relates to the weight of the water that is used to drive the turbine. This weight issue can be especially a concern for systems used in transportation, such as for land, water, air, and space vehicles, to name just a few examples. The use of water can also be of concern where a suitable water supply is scarce, such as in deserts. A number of unique and inventive systems have been developed to address these concerns as well as others.

Figure 16:
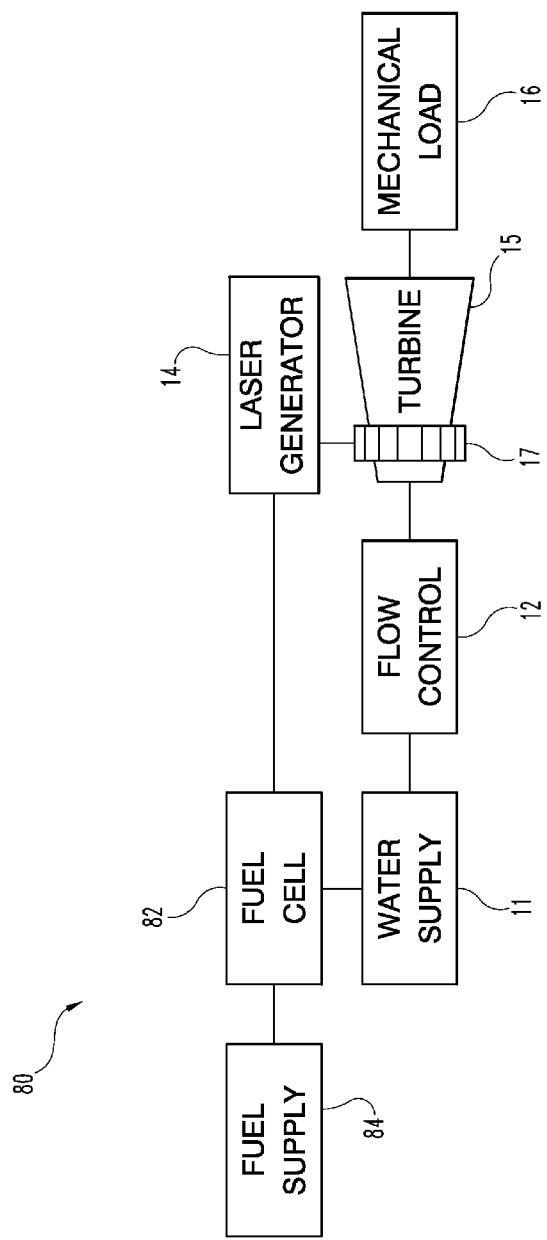
FIG. 16 is a block diagram that shows supplementing a steam turbine water supply with water from a fuel cell.

In one example, the byproduct produced during the generation of power used to generate the laser energy acts as a propellant by being vaporized inside the turbine. FIG. 16 is a block diagram of one such system 80. Like before, the system 80 includes the water supply 11, flow control 12, laser generator 14, turbine 15, mechanical load 16, and the array 17 of one or more nozzles 29. These components function generally in the same manner as described before. For the sake of brevity and clarity, the structure and function of these common components will be not again discussed in great detail. In the FIG. 16 system, a fuel cell 82 generates the electric energy used to power the laser generator 14. A fuel supply 84 supplies fuel, like hydrogen, hydrocarbons, alcohol, etc., to the fuel cell in order to create the electricity. In this example, the fuel cell 82 produces water as a byproduct during the production of energy. The water from the fuel cell 82 is then fed to the water supply 11. The water from the fuel cell in the water supply 11 is used in the same manner as described above. That is, the flow of water supplied from the water supply 11 to the turbine 15 is controlled by the flow control 12. The water is then vaporized inside the turbine by one or more laser beams from the laser generator 14. The resulting mechanical power from the turbine 15 drives the mechanical load 16. All or part of the water from the fuel cell 82 can be used to power the turbine 15. For instance, some of the water from the fuel cell can be used for other purposes, such as for cooling. In another variation, the water from the fuel cell 82 supplements water provided by another source. For instance, the water from the fuel cell can be added to a storage tank that is already supplied with water. Even when the water from the fuel cell 82 is unable to supply all of the water needs of the turbine 15, this use of the water produced from the fuel cell can extend the time between resupplying or refilling of the water supply, and in addition, the overall weight of the system 80 is reduced. For transportation, these features in turn can extend the mileage for vehicular or other forms of transportation.

Figure 17:
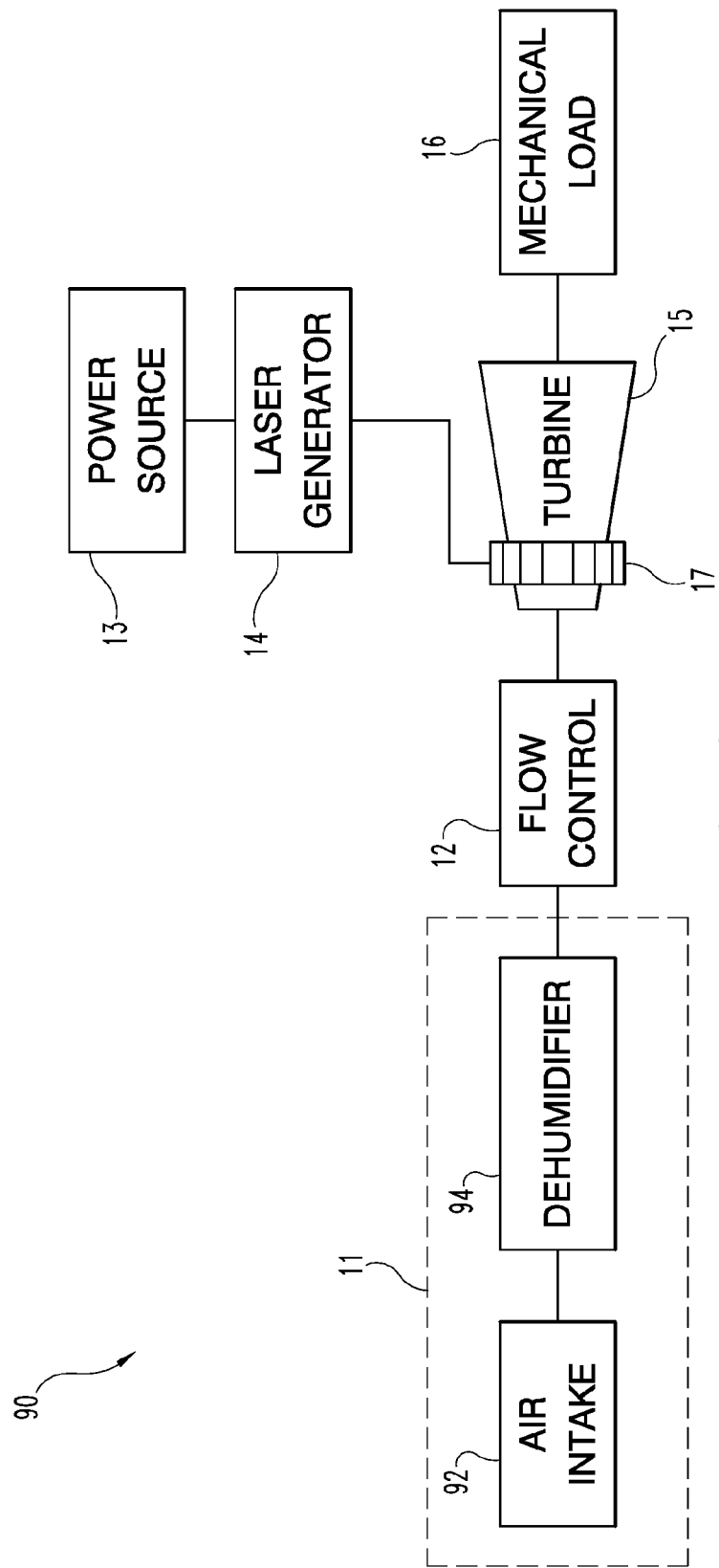
FIG. 17 is a block diagram that shows supplementing a steam turbine water supply with water removed from the air.

In another aspect, the water vaporized in the turbine 15 can be continuously (or near continuously) supplied from the outside environment, thereby eliminating or reducing water storage weight as well as the need to refuel with water. FIG. 17 illustrates one example of a system 90 in which the water for the turbine 15 is at least in part or in whole replenished from the outside environment on a continuous or near continuous basis. Like the previous examples, the system 90 in FIG. 17 includes the water supply 11, flow control 12, power source 13, laser generator 14, turbine 15, mechanical load 16, and nozzle array 17. For the sake of brevity and clarity, the structure and function of these common components will be not again discussed in great detail, but please refer to their previous description. In the illustrated embodiment, the water supply includes an air intake 92 that supplies air to a dehumidifier 94. The air intake 92 in one embodiment comes in the form of a duct for transferring air to the dehumidifier, but the air intake 92 can come in other forms as well. The dehumidifier 94 condenses the water out of the air that is supplied to the turbine 15. The dehumidifier 94 can include components found in traditional dehumidifiers, such as one or more compressors, cooling coils, etc., and the dehumidifier 94 can further include one or more storage tanks for storing water produced by the dehumidifier 94 or supplied from some other source. In one particular example, the dehumidifier 94 can be part of an air conditioning system used to cool a vehicle cabin or temperature sensitive components. In one embodiment, the dehumidifier 94 is powered by the same power source 13 used to power the laser generator, but in other embodiments, the dehumidifier 94 can be powered by other power sources. From the dehumidifier 94, the condensed water is then supplied to the turbine 15 through the flow control 12 and vaporized by the laser generator 14 in order to supply mechanical power to the mechanical load 16. The water supplied by the dehumidifier 94 can partially or completely satisfy the water demands of the turbine 15.

Figure 18:
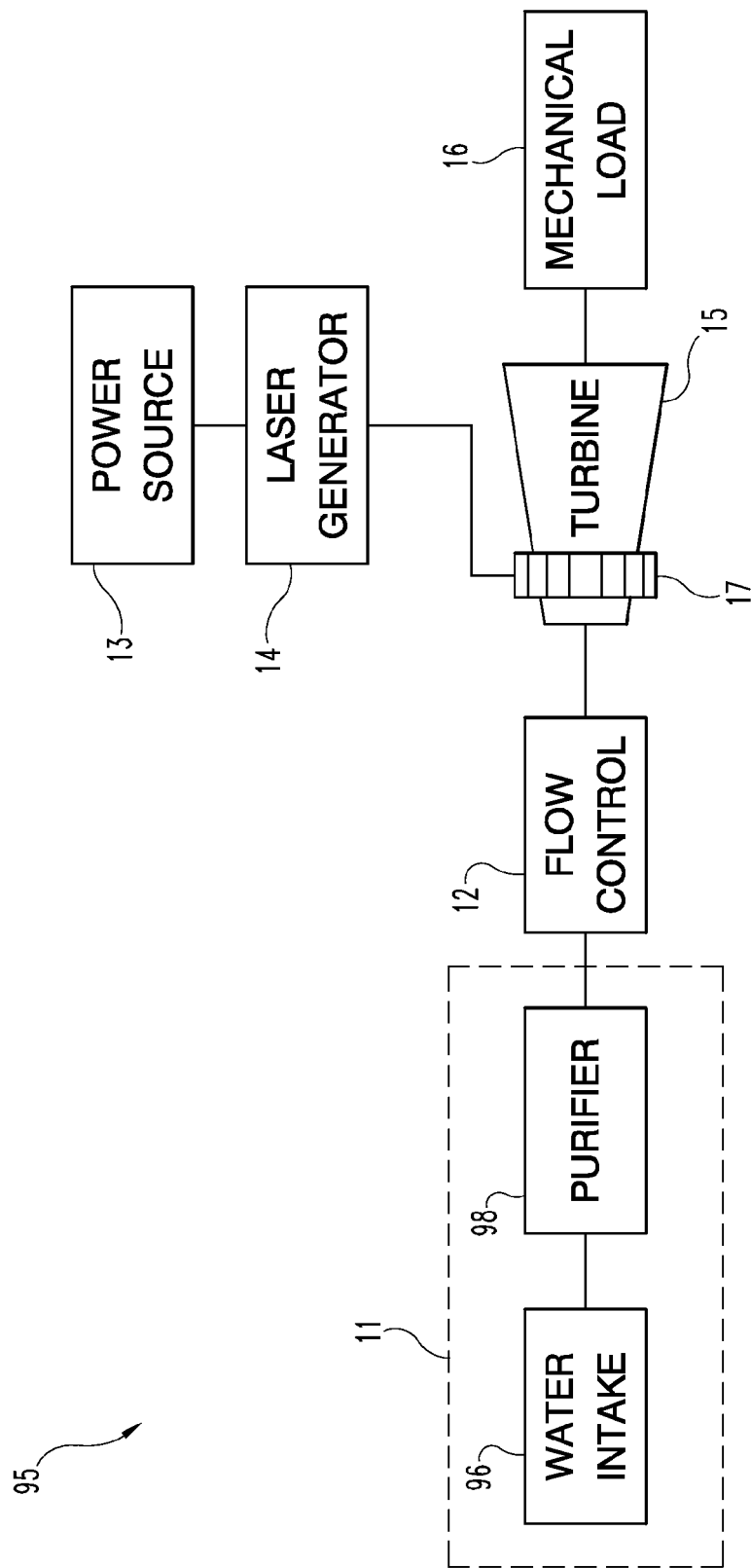
FIG. 18 is a block diagram that shows supplementing a steam turbine water supply with water from a body of water.

FIG. 18 illustrates an example of another system 95 in which the water for the turbine 15 is at least in part or in whole replenished from the outside environment on a continuous or near continuous basis. In this particular example, the water is obtained from a body of water, like an ocean, river, lake, stream, aquifer, etc. The system 95 in FIG. 18 includes the components discussed before, like the flow control 12, power source 13, laser generator 14, turbine 15, and mechanical load 16. In the FIG. 18 embodiment, the water supply 11 includes a water intake 96 through which the water from the water source is drawn and a purifier 98 that removes impurities in the water that might harm the turbine 15. The water intake 96 can come in many forms. For example, the water intake 96 can be a simple pipe that draws the water out of the body of water and/or includes a pump for pumping the water from the water body. The purifier 98 acts to protect the turbine 15 by filtering out contaminants. For instance, when the system 95 draws seawater, the purifier 98 can include a desalination system to remove damaging salt from the water. Alternatively or additionally, the purifier 98 can incorporate filters for filtering out matter that could erode or otherwise damage the turbine blades. Where the water quality from the body of water and/or the life of the turbine 15 is not a concern, the purifier 98 can be optional in other embodiments. For a water vessel with this system 95, the water is obtained directly from the body of water, vaporized, passed through the turbine 15, and discharged back to the body of water and/or the atmosphere, avoiding the necessity of storing water on board the vessel.

Figure 19:
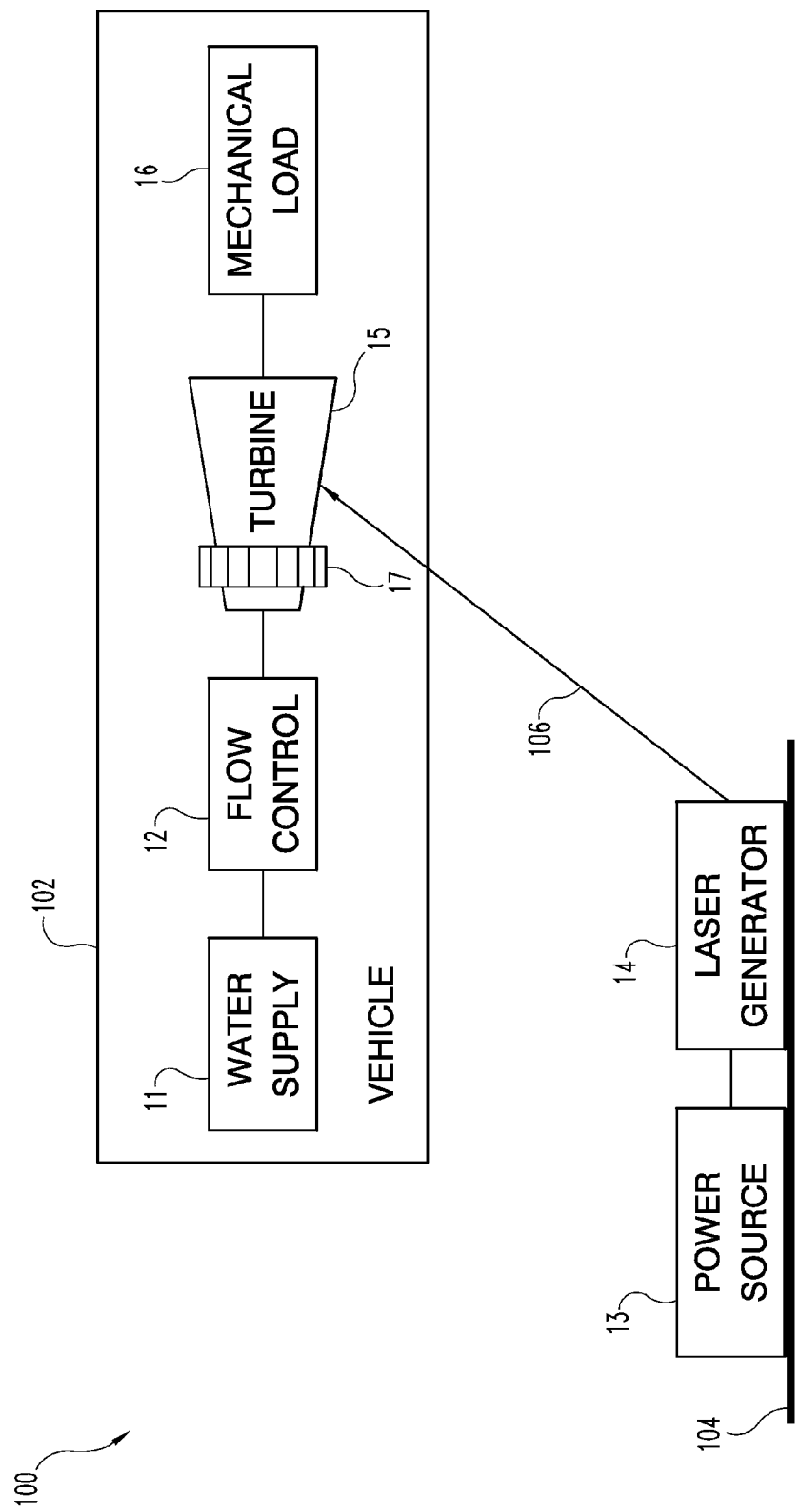
FIG. 19 is a block diagram of a steam turbine system in which the laser is remote from the steam turbine.

Alternatively or additionally, the weight of the system can be further reduced by transmitting the laser energy from a remote location. FIG. 19 shows a diagram of such a remotely powered system 100. As can be seen, a vehicle 102 in this case includes the water supply 11, flow control 12, turbine 15, mechanical load 16, and nozzle array 17 of the type that was described previously. The mechanical load 16 in this embodiment at least in part aids in movement of the vehicle 102. For example, the mechanical load 16 can include a propeller, wheel, etc. that moves the vehicle 102. To reduce the weight and/or size of the vehicle 102, the power source 13 and laser generator 14 are positioned at a location 104 that is remote from the vehicle 102. In one example, the power source 13 and laser generator 14 are land based while the vehicle 102 is in the form of an airplane, blimp, helicopter and/or some other air type vehicle. In other examples, the vehicle 102 can be a land-based, naval-based, and/or space-based type vehicle. To power the turbine 15, the laser generator 14 shines one or more laser beams 106 towards the vehicle 102. In the illustrated embodiment, the laser beam 106 is aimed directly at the turbine 15, but the vehicle 102 can include optics to redirect the laser beam 106 within the vehicle 102 to the laser steam generator nozzles. Not only does this configuration reduce the weight of the vehicle 102, which in turn enhances fuel economy, it also can reduce the overall system cost. For instance, the same laser generator 14 can be used to power multiple vehicles sequentially or simultaneously. In addition, larger and more powerful power sources 13 and laser generators 14 can be used as to power the vehicles 102. To guide the laser beam 106, the system 100 can further include tracking equipment that tracks the location of the vehicle 102. In another variation of the system 100 in FIG. 19, instead of powering a moveable vehicle, the laser beam 106 is used to power one or more stationary locations.

Figure 20:
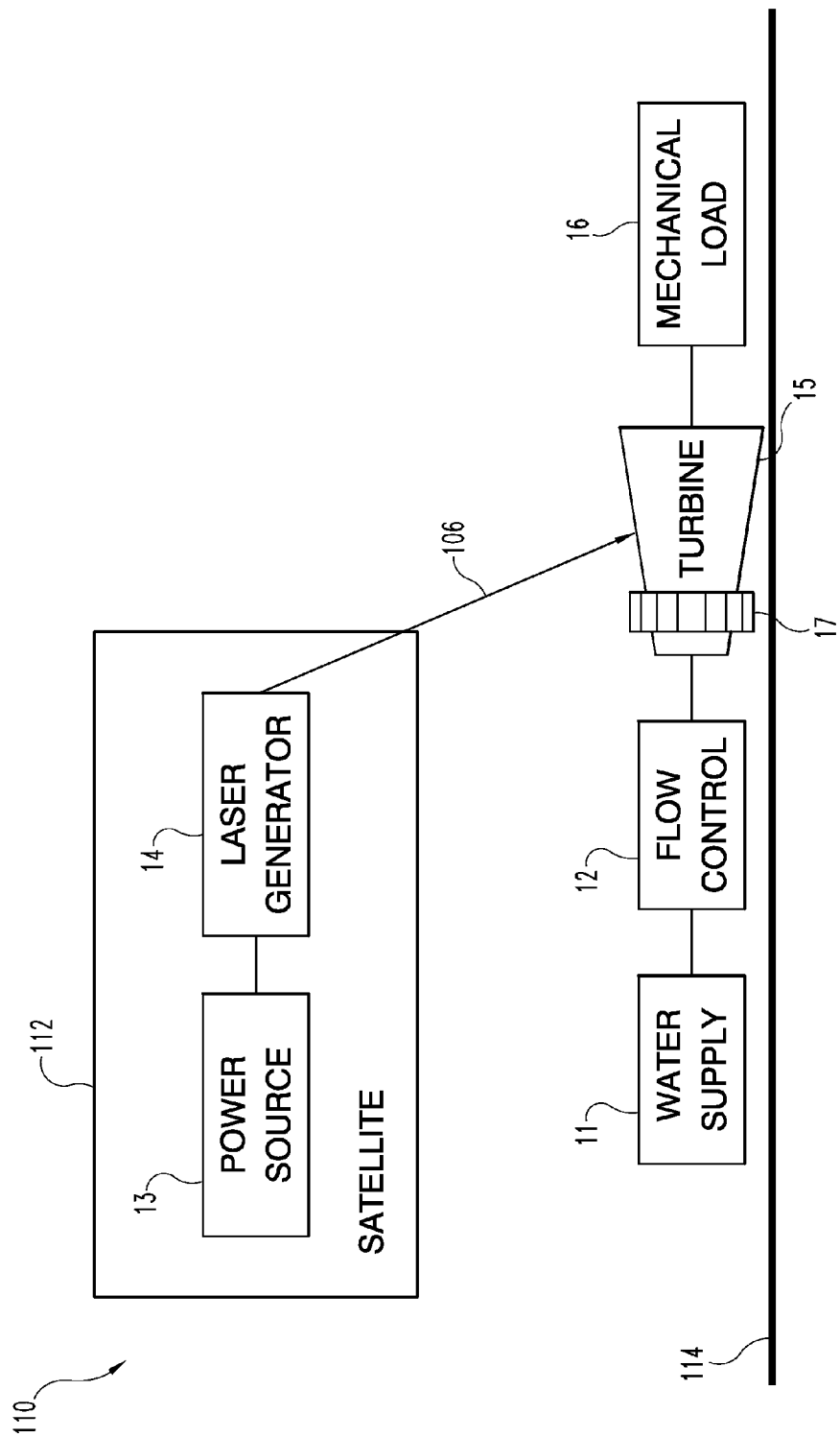
FIG. 20 is a block diagram of a steam turbine system in which a laser beam from a satellite is transmitted to a ground station

FIG. 20 illustrates an alternate example in which the turbine 15 is stationary and the laser generator 14 is moveable. In particular, system 110 in FIG. 20 includes a satellite 112 and a power generation unit 114. In the illustrated example, the satellite 112 can be located in a geostationary or non-geostationary orbit, and the power generation unit 114 is stationary and ground based. In other examples, the power generation unit 114 can be moveable. For instance, the power generation unit 114 can be located in space, on the ocean, in the air, etc. The satellite 112 includes the power source 13 that powers the laser generator 14. In the depicted example, the power source 13 includes solar cells that gather energy from a star like the sun. In another example, the power source 13 generates power by passing through a planet's magnetic field. The power generation unit 114 includes the water supply 11, flow control 12, turbine 15, and nozzle array 17 of the type previously described. In this embodiment, the mechanical power generated by the turbine 15 powers an electric generator 116 in order to generate electricity. The laser generator 14 on the satellite 112 shines one or more laser beams 106, which in turn power the turbine 15 in the manner as described before. The ground based power generation unit 114 can include other components as well. For instance, the ground based power generation unit 114 can include a collector that collects the laser energy beamed from the satellite 112. Likewise, the satellite 112 can incorporate other components. For instance, the satellite can include guidance equipment so that the laser beams 106 are aimed properly. In other examples, that satellite can power more than one power generation unit 114. By being located in space, the satellite 112 is able to receive uninterrupted sunlight so as to provide a clean source of energy.

Figure 21:
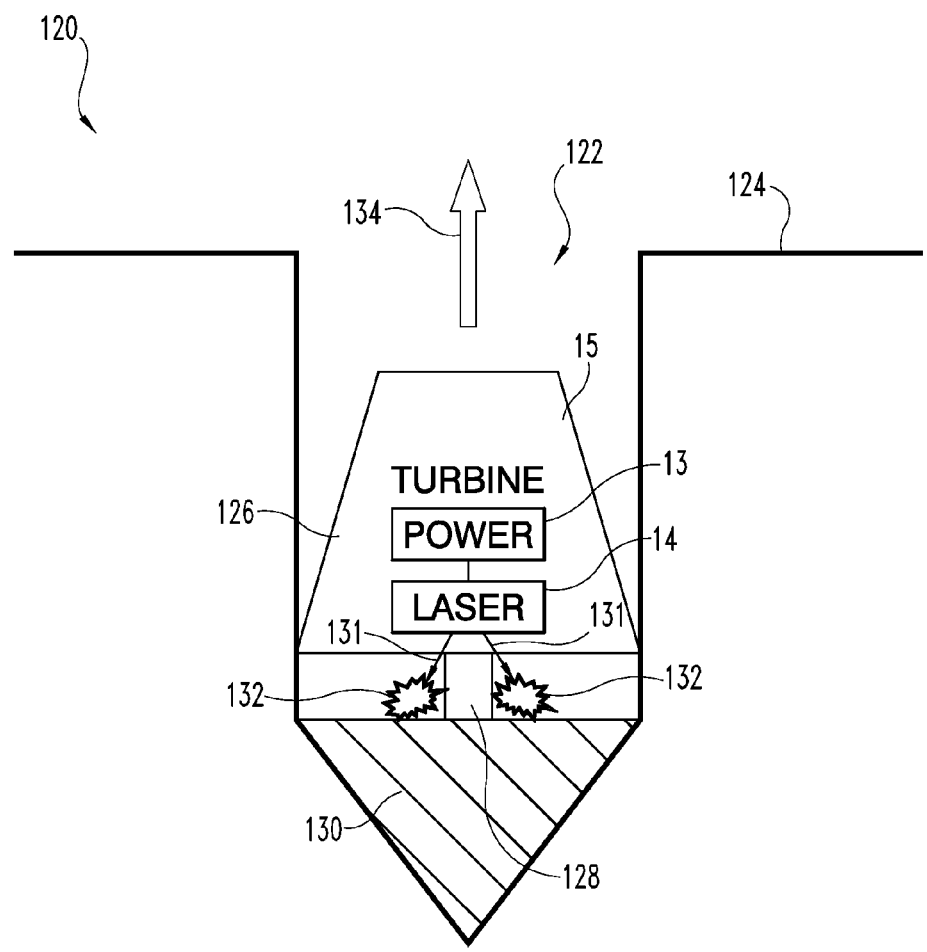
FIG. 21 is a diagram of a self-powered steam turbine drill.

Instead of using liquid sources to create the steam for driving the turbine, solid materials can be vaporized to form the gas that drives the turbine. FIG. 21 illustrates a drilling system 120 that utilizes this principal. As will be recognized, the system 120 in FIG. 21 not only provides a unique power source, it also addresses the issues associated with removal of debris created by the drilling process. In the illustrated embodiment, the drilling system 120 is used to drill a hole 122 in a layer of ice 124, but it is contemplated that the system 120 can be used to drill openings in other types of materials. The drilling system 120 has a drilling unit 126 that creates the hole 122 in the ice 124, and the drilling unit 126 includes several components that were previously described. For instance, the drilling unit 126 includes the power source 13 that powers the laser generator 14 and the turbine 15. As can be seen, the turbine 15 has a drive shaft 128 that rotates a drill or cutting head 130 that in turn cuts the hole 122 in the ice 124. In the illustrated example, the drilling unit 126 is a unitary, self-contained unit in which all of the components are incorporated into a single unit that is able to perform the drilling process. However, the drilling unit 126 in other embodiments can have separate components. For instance, the power source 13 and laser generator 14 can be located outside of the hole, and optical fibers (or the air) transmit the laser energy to the drilling unit 126.

One issue in drilling to any significant depth is the problem of the removal of debris created by the drilling process from the hole 122. As alluded to before, the drilling system 120 addresses this issue by using laser beams 131 from the laser generator 14 to vaporize ice chunks, shavings, dust, as well as other types of debris 132 created by the drilling process. The resulting steam drives the turbine 15, which in turn drives the drill head 130. The resulting steam, as is indicated by arrow 134, is discharged from the turbine 15 and readily vented out of the hole 122. In addition, the exhausted steam 134 provides thrust to further facilitate the drilling process. In the depicted embodiment, the debris 132 is vaporized outside of the turbine 15, but in other embodiments, the debris 132 can be vaporized inside the turbine 15. The turbine 15 and the drill head 130 are generally flush in the illustrated embodiment so as to entrap the steam, but the drilling unit 126 can be shaped differently in other embodiments. It is also envisioned that the nozzles of the type described above can be used to vaporize the ice.

In the above-mentioned embodiments, the medium for powering the turbine has been described as being water. Nevertheless, it should be recognized that other mediums can be heated and used to power the turbines, such as alcohol and other types of liquids. For example, other byproducts produced by the fuel cell 82 in FIG. 16 can be used to power the turbine. It should be recognized that the water source can be in many forms. Moreover, one or more water sources can be used in the same system. For instance, the system 80 in FIG. 16 can be modified to receive water not only from the fuel cell 82 but also from the air (FIG. 17) and/or a body of water (FIG. 18). This helps to ensure that an adequate water supply is available in emergency situations and/or when one source by itself is unable to provide an adequate supply of water. In another example, the water supplies 11 in the FIGS. 19 and 20 embodiments are modified to collect water from a fuel cell, the air, and/or a body of water. In still yet another example, the electric motor 71 and/or the laser generator 14 in FIG. 15 can be powered by a fuel cell, and the water from the fuel cell, the atmosphere, and/or the body of water can be vaporized in the turbine 15. The systems described above have been described as converting liquid water to steam. That is, the water undergoes a phase change. It, however, should be recognized that these systems can heat the liquid water or steam without the heated medium changing phase. Other phases of matter can be used to generate power within the turbine as well. For example, supercritical steam, with pressure and temperature at (or above) the critical point, can be used. With supercritical steam, water is actually heated to such a high pressure that boiling does not even occur, and at this point, the molecules are forced together to the point that the water becomes more like a liquid again, while retaining the properties of a gas. It is at this point that the water becomes a supercritical fluid. The resulting high-pressure fluid of supercritical steam provides excellent energy efficiency. With the aid of high pressure, supercritical steam turbines can be driven to much higher speeds for the same amount of heat energy as traditional steam power.

The liquid water can be supplied to the laser steam generator nozzle through various types of pipes and/or conduits. In several embodiments, the liquid water is preheated before being introduced to the turbine in order to reduce the required energy to vaporize the water. In one form, the water is preheated by the heat irradiated from the power source, the laser generator, the turbine, and/or other devices. For example, the liquid water can be preheated by flowing through a heat exchanger located at the exhaust and/or in the housing of the turbine so as to not only preheat the water but also to cool the turbine. The water can be circulated through the turbine blades so as to cool the blades and preheat the water. In still yet another example, the water is preheated by running it through one or more heat exchange jackets that surround the power source and/or the laser generator. It should be recognized that the water can be preheated in other manners. The above-discussed drawings typically show a single water supply conduit for the turbine, but in use, one or more conduits can supply water to the turbine. The water supplied to the laser steam generator nozzle can be a laminar or non-laminar flow. For instance, the water can be pulsed, and when the water is pulsed, the laser can be pulsed to match the pulsing of the water, or vice versa.

As noted before, by vaporizing water within the nozzle, the need for a bulky and heavy boiler is eliminated, thereby making the systems less susceptible to over pressure and boiler explosions. Of course, certain features described above can be incorporated into systems in which the water is vaporized outside of the turbine, such as in a boiler. As an example, the systems in FIGS. 15, 16, 17, 18, 19, and 20 can be modified in such a manner that the water is vaporized outside of the turbine. Nozzles are used in the illustrated embodiments to vaporize water inside the turbine, but the nozzles can be omitted or replaced by a different structure in other embodiments. More or less nozzles than illustrated and/or described (or even one nozzle) can also be used in other embodiments.

The nozzles in the previous examples ensure complete vaporization of the water so that dry steam is produced inside the turbine. However, the above-described nozzles can be adapted for use in other environments. For instance, the nozzles can be used to simply heat (and not boil) the water for continuous type water heaters. With the above-described nozzles, the water and laser energy can be introduced in other manners. Instead of using fiber optics to introduce the laser beams, parts of the nozzle can be transparent (or removed) so that the laser beams can be introduced into the nozzle. In another example, the laser beams can be introduced by being internally reflected inside one or more streams of water. The water can be introduced by one or more laminar streams, non-laminar streams, misting, and/or in other manners. The laser beams and water streams in the illustrated embodiments generally move in the same direction so that some residual velocity is imparted onto the vaporized steam, but it is contemplated that the laser beams and water streams can be oriented in other manners, such as in perpendicular or opposing fashions. It is also contemplated that in other variations other forms of energy besides lasers can be used to vaporize the water. For instance, non-coherent forms of electromagnetic radiation can be used to heat and/or vaporize the water. In other variations, the frequency of the laser beams can be tuned to boil the water.

It is envisioned that any number of power sources, either alone or in combination, can power the above-described laser generators. Examples of power sources that power the lasers include batteries, nuclear, solar, wind, flywheel, geo-thermal, fuel cell, and/or chemical power sources, to name just a few examples.

The mechanical power generated by the above-described systems can be used in a multitude of environments. For example, the mechanical power can be used to drive the wheels of a land vehicle, screw or propeller of a ship or submarine, a turbofan or propeller of an aircraft (or act as a turbo-fan or turbo-prop), power a pump and/or in other areas where mechanical power is required.

The controller in the illustrated embodiments includes electronics, such as memory, processors, and other types of circuitry. It is contemplated that the other embodiments that do not illustrate a controller can include a controller, such as the one depicted in FIG. 14, that controls the operation of the system. Besides the illustrated sensors, the controller can receive information from other input sources and/or sensors. For instance, the controller can be operatively coupled to a sensor that measures the speed of the turbine, temperature, flow, etc.

In the drawings, the various components are illustrated as being separate components, but in other embodiments, one or more components can be combined to form a single unit. For example, the power source and the laser generator can be combined as a single unit, such as when the laser generator is a chemical type laser generator. In other examples, the flow control can be incorporated into the water source and/or the nozzle. Of course, other combinations are possible.

As used in the specification and claims, the following definitions apply:

As referred to herein, the term "laser" is meant to be used in a broader context. As should be recognized, a device that produces any particles or electromagnetic radiation in a coherent state is considered a laser. In most cases, "laser" refers to a source of coherent photons, i.e. light or other electromagnetic radiation. The word "light" in the acronym Light Amplification by Stimulated Emission of Radiation (laser) is typically used in the expansive sense, as photons of any energy; it is not limited to photons in the visible spectrum. As a result, there are X-ray lasers, infrared lasers, ultraviolet lasers, and the like. For example, a microwave equivalent to an optical laser is commonly called a "maser", but it should be recognized that for the purposes of discussion herein that masers are considered a type of laser. Although the techniques and systems were described with reference to optical or near-optical-type lasers, it should be appreciated that other types of lasers can be used. In one particular form, a maser is used to heat the water because of microwaves ability to rapidly and efficiently boil the water through dielectric heating. In another form, the laser is an infrared (IR), solid-state laser. Of course, in other embodiments, lasers of different frequencies can be used to vaporize the water within the steam generator nozzle. The laser beam created can be a continuous-type laser or a pulse-type laser. As alluded to before, the laser can come in many wavelengths. Lasers are sometimes considered as emitting light with a narrow wavelength spectrum ("monochromatic" light), but for the purposes of this description, lasers are considered to be in a broader sense. For example, some lasers emit light with a broad spectrum, and others emit light at multiple distinct wavelengths simultaneously. The laser beams produced by the systems described herein can be any type of beam. That is, laser beams can include narrow spectrum beams, broad spectrum beams, and/or beams with simultaneous but distinct wavelengths. The laser beam generators can include gas (helium-neon, carbon dioxide, argon-ion, nitrogen, metal-ion, etc.), chemical, excimer, solid state, fiber hosted, photonic crystal, semiconductor, dye, and/or free electron type laser generators, just to name a few non-limiting examples. One or more laser beams can be supplied to the nozzle, and in one example, multiple beams are supplied through for example multiple laser generators, beam splitters, etc.

The turbines described in the previous embodiments can come in many forms, such as a bladeless (or Tesla type) turbine, turbofan, a turbo prop, etc. The term "turbine" generally refers to a machine in which a moving fluid, such as steam, acts on the blades of a rotor to produce rotational motion. For example, a steam turbine is a mechanical device that extracts thermal energy from pressurized steam and converts it into useful mechanical work. The steam turbine is a form of heat engine that derives much of its improvement in thermodynamic efficiency through the use of multiple stages in the expansion of the steam (as opposed to the one stage in the Watt engine), which results in a closer approach to the ideal reversible process. These types include condensing, noncondensing, reheat, extraction, and induction. To maximize turbine efficiency, the steam is expanded, generating work, in a number of stages. These stages are characterized by how the energy is extracted from them and are known as impulse or reaction turbines. Most modern steam turbines are a combination of the reaction and impulse design. Typically, higher pressure sections are impulse type and lower pressure stages are reaction type. Any imbalance of the rotor can lead to vibration, which in extreme cases can lead to blade failure. It is, however, essential that the turbine be turned with dry steam. If water droplets are in the steam and are blasted onto the blades (moisture carryover), rapid impingement and erosion of the blades can occur, possibly leading to imbalance and failure. Also, water entering the blades will likely result in the destruction of the thrust bearing for the turbine shaft.

The efficiency and lifetime of steam-powered equipment are affected by the quality, or wetness, of the steam used. Steam quality is defined as the mass fraction of the total fluid mass that is in the vapor phase. Dry steam or steam of 100% quality consists solely of water vapor, while qualities less than 100% indicate that water is present in the liquid phase. Condensate may form due to temperature drops in some part of the system. Wet steam contains less useable energy than dry steam. In turbine systems, steam tends to become "wetter" as it expands. The subsequent impingement of water droplets that form, as well as entrained droplets, can initiate corrosion on turbine blades. In addition, entrained droplets often contain solids that can deposit on turbine surfaces, adversely affecting the flow stream and turbine efficiency as well as potentially causing imbalance and necessitating cleaning operations.

As noted above, vaporizing within the nozzle integral to the turbine is desirable for several reasons, including reducing the chance of producing harmful wet steam. What is meant by vaporizing the water inside the nozzle is that the water is vaporized inside the casing or housing of the turbine that normally houses the rotor and turbine blade. In other words, the water is vaporized in close proximity to the turbine blade so as to reduce any heat loss. In the illustrated embodiments, the nozzles are positioned inside the casing of the turbine, but it is contemplated that parts of the nozzle may protrude outside of the turbine casing.

The term "open system" generally means that the water (or other medium) is not recirculated within the system to be used by the turbine again. Instead, the liquid water or steam is discharged into the surrounding environment. In certain embodiments, before being discharged, the steam can be condensed and/or liquid water cooled so as to reduce the amount of thermal pollution.

As used herein, a "closed system" is a system in which the liquid water or steam that drives or passes through the turbine is condensed and returned to the steam turbine system to be boiled to steam again for driving the turbine. Of course, the system might not be completely closed in a sense due to leakage or bleeding of steam or liquid water from the system.

The language used in the claims and specification is to only have its plain and ordinary meaning, except as explicitly defined above. The words and the above definitions are to only have their plain and ordinary meaning Such plain and ordinary meaning is inclusive of all consistent dictionary definitions from the most recently published Webster's Dictionaries and Random House Dictionaries.

While the disclosures have been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

What is claimed is:

1. A method, comprising:
vaporizing water with electromagnetic radiation within a turbine to form steam, wherein said vaporizing the material includes
supplying the water to a nozzle,
vaporizing the water with the electromagnetic radiation within the nozzle, and
reflecting the electromagnetic radiation within the nozzle to pass through the water more than once; and
powering the turbine with the steam.

2. The method of claim 1, wherein the water includes liquid water.

3. The method of claim 1, wherein the electromagnetic radiation includes a laser beam.

4. The method of claim 1, further comprising:
wherein the nozzle includes a reflection area;
wherein the electromagnetic radiation reflects at the reflection area of the nozzle; and
cooling the reflection area of the nozzle by directing at least one of the water or steam to the reflection area.

5. The method of claim 1, wherein said reflecting the electromagnetic radiation within the nozzle includes containing the electromagnetic radiation within the nozzle.

6. The method of claim 1, further comprising:
measuring a property of the electromagnetic radiation during said vaporizing the water; and
adjusting the supply of at least one of the water or the electromagnetic radiation based on the property of the electromagnetic radiation measured.

7. The method of claim 1, further comprising:
producing the electromagnetic radiation with power created with a fuel cell, wherein a byproduct of the fuel cell includes the water; and
supplying the water from the fuel cell to the turbine.

8. The method of claim 1, further comprising:
condensing the water from the atmosphere; and
supplying the water condensed from the atmosphere to the turbine.

9. The method of claim 1, further comprising:
wherein the water includes liquid water;
drawing the liquid water from a body of water; and
supplying the liquid water from the body of water to the turbine.

10. The method of claim 1, wherein the water includes ice.

11. The method of claim 1, further comprising:
supplying power from a power source to generate the electromagnetic radiation;
powering a drill head with the turbine;
wherein the water includes ice;
drilling into the ice with the drill head; and
wherein said vaporizing the water includes vaporizing debris created by said drilling.

12. The method of claim 1, wherein:
the turbine includes a housing; and
said vaporizing the water with the electromagnetic radiation occurs within the housing of the turbine.

13. The method of claim 1, further comprising:
discharging the steam from the turbine to the outside environment.

14. The method of claim 1, further comprising:
recirculating the steam from the turbine back to the turbine.

15. The method of claim 1, wherein:
the turbine includes a rotor with blades; and
said powering the turbine includes rotating the rotor with the steam.

16. The method of claim 1, wherein:
the steam is dry steam;
said vaporizing includes producing the dry steam that lacks any of the water in a liquid phase.

17. The method of claim 1, further comprising:
powering a mechanical load with the turbine; and
switching powering of the mechanical load to an electric motor when a specified operational parameter is reached.

18. The method of claim 17, wherein the mechanical load is a drive train of a vehicle.

19. The method of claim 1, further comprising:
transmitting the electromagnetic radiation from a source that is remotely located relative to the turbine.

20. The method of claim 19, further comprising:
moving a vehicle with the turbine; and
wherein said transmitting the electromagnetic radiation comes from a stationary source.

21. The method of claim 19, wherein said transmitting the electromagnetic radiation occurs from a satellite.

\* \* \* \* \*